May 4, 1965  D. B. LUCIUS ETAL  3,181,747
FOLDING TABLE
Filed March 18, 1963  10 Sheets-Sheet 1

INVENTORS
DONALD B. LUCIUS
VIRGIL R. CARPENTER
BY
Dugger Braddock Johnson & Westman
ATTORNEYS

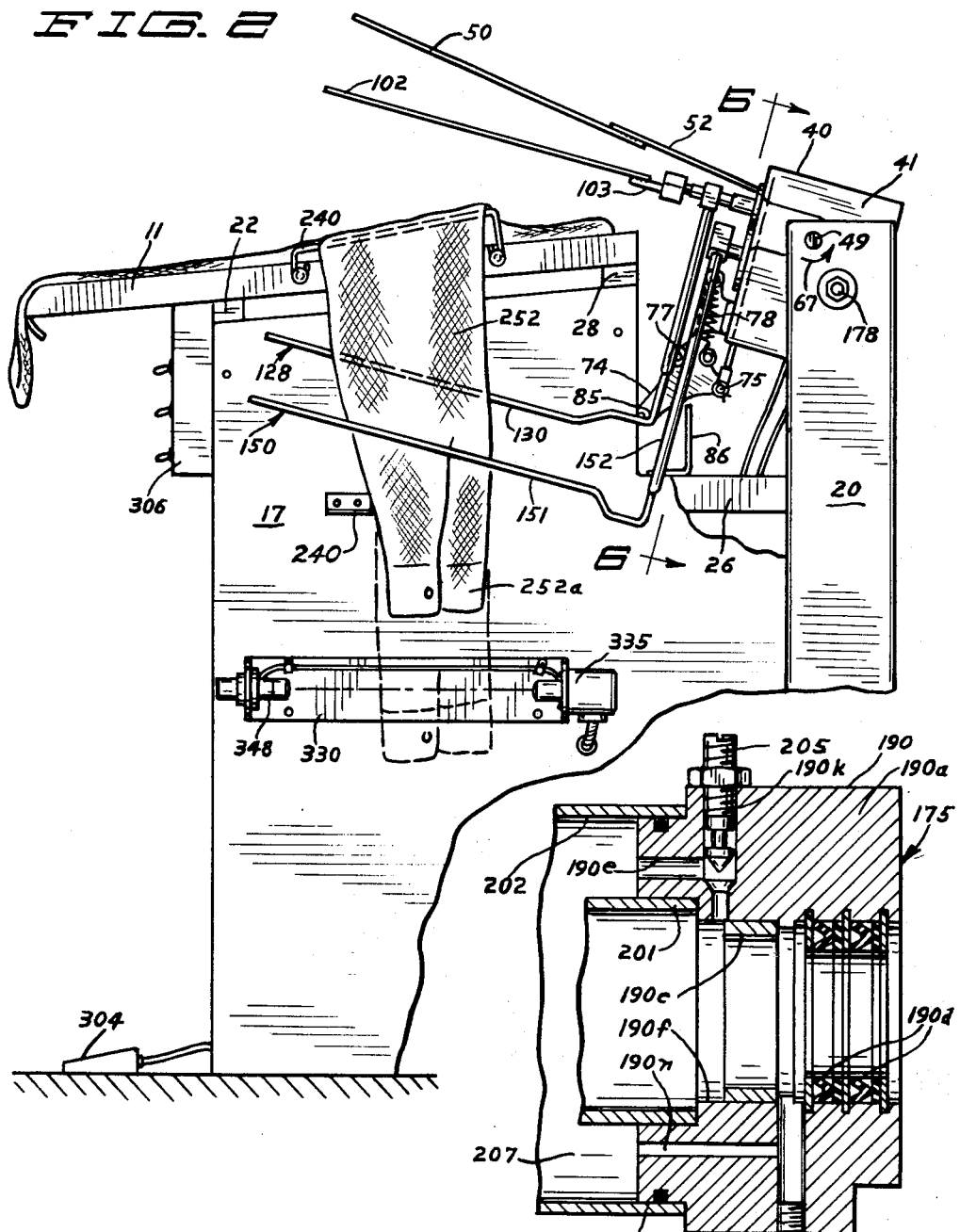

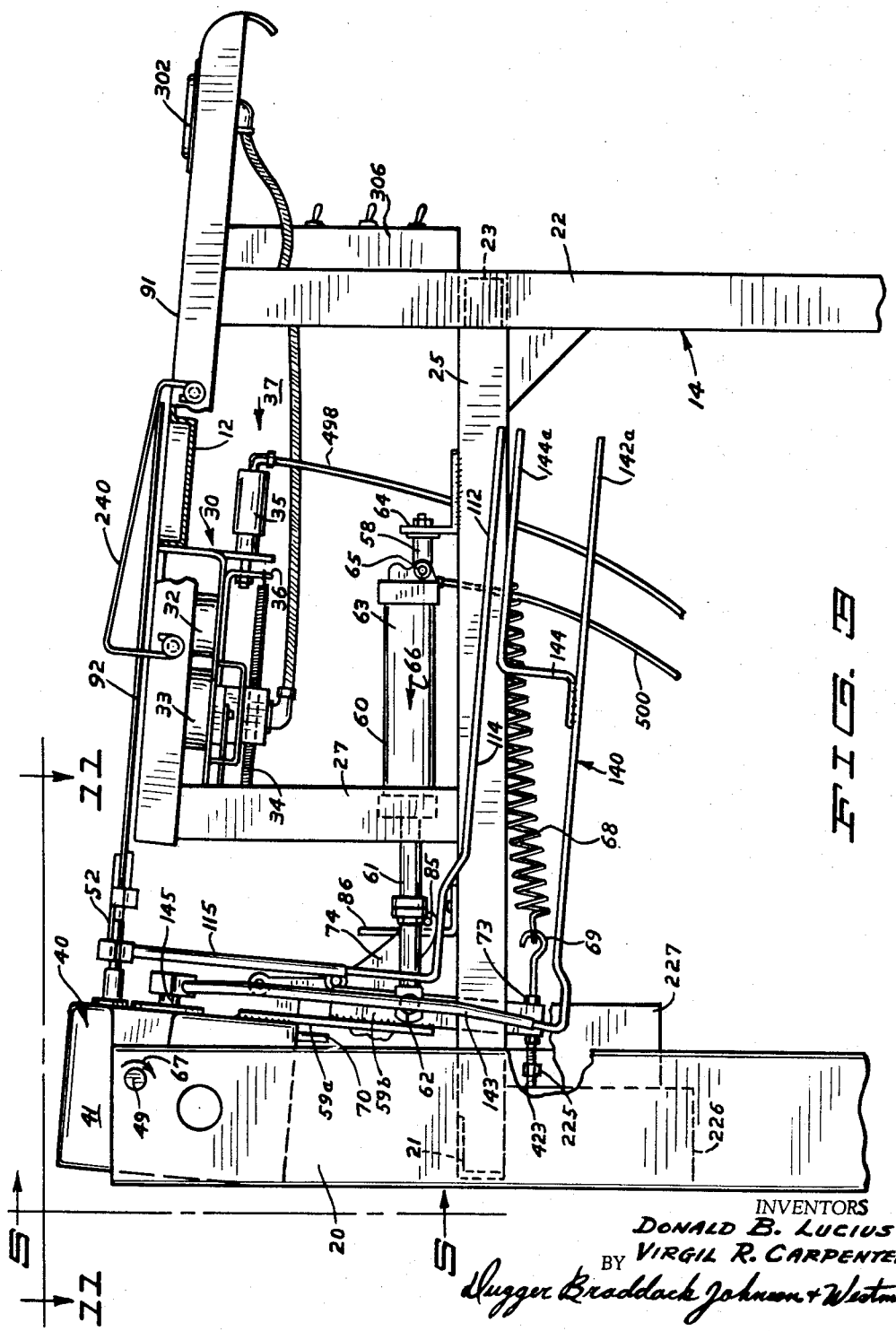

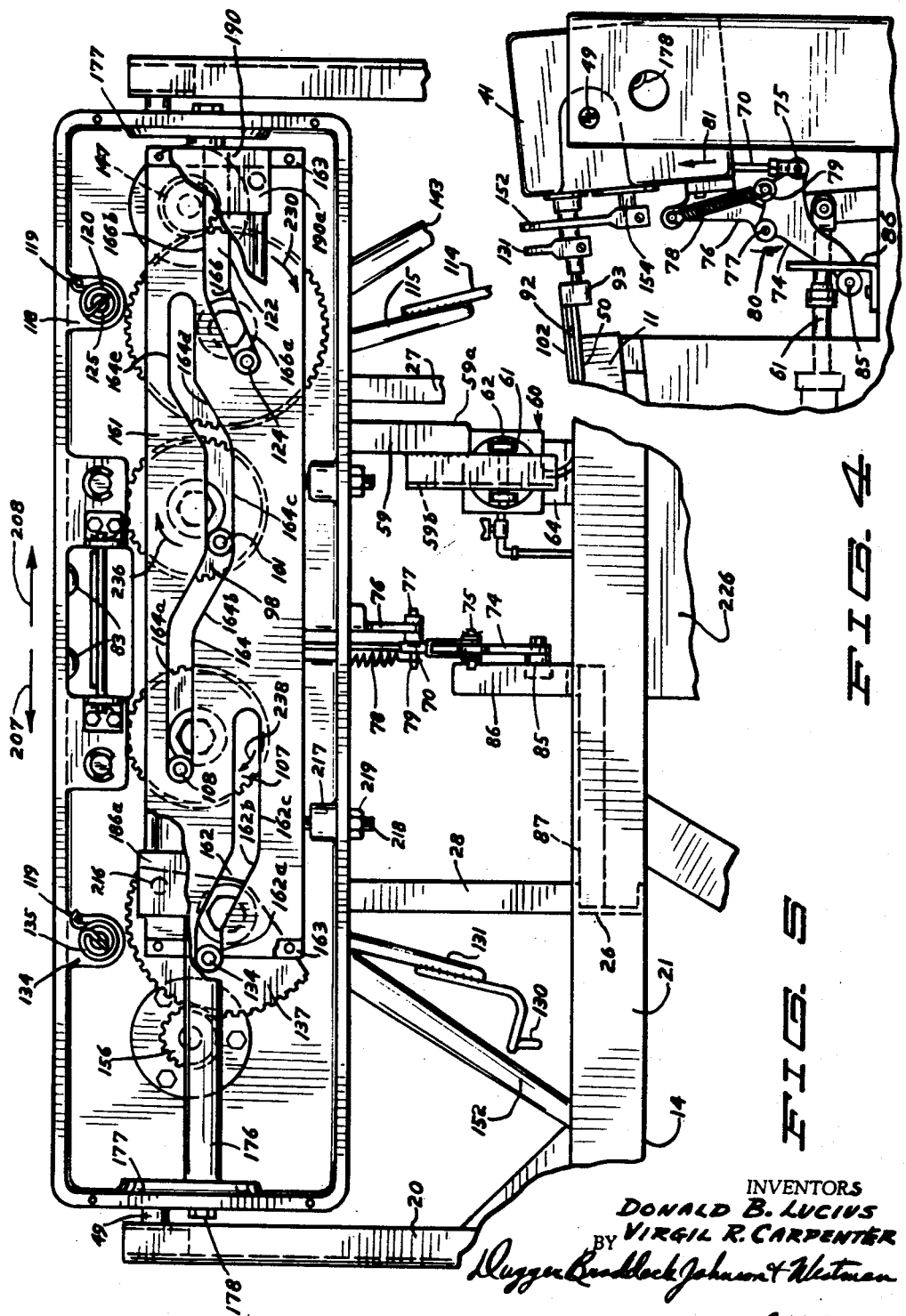

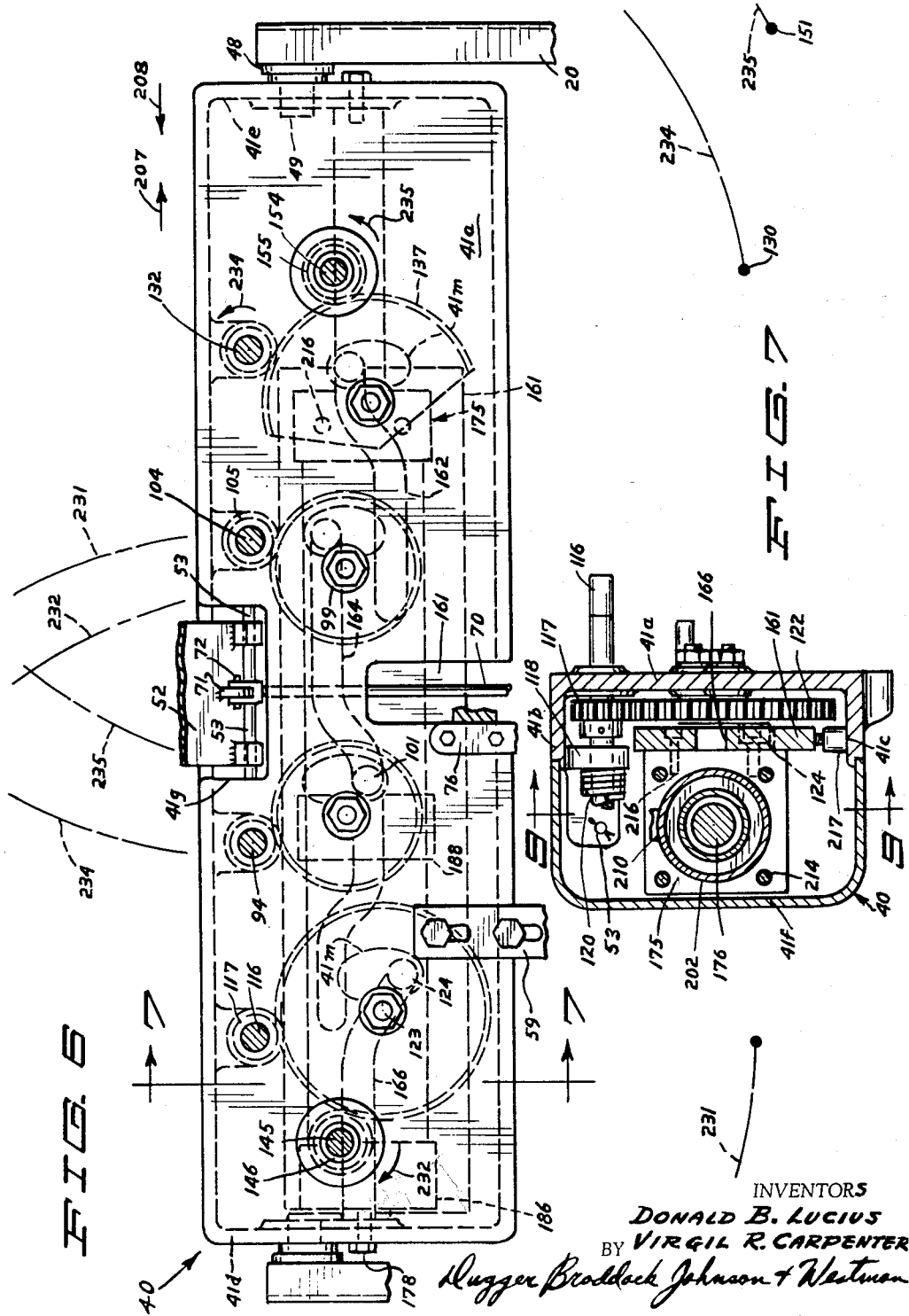

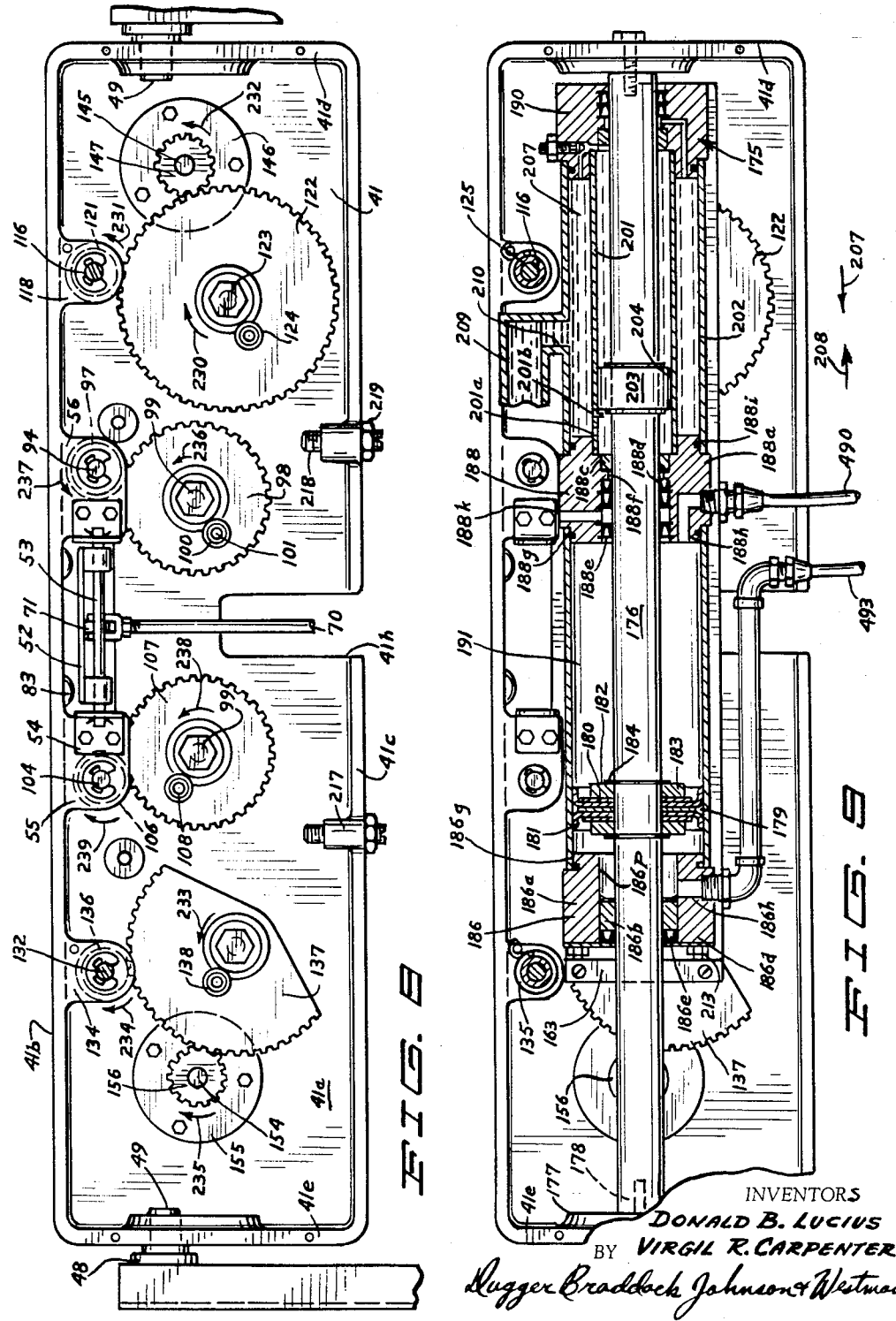

May 4, 1965   D. B. LUCIUS ETAL   3,181,747
FOLDING TABLE
Filed March 18, 1963   10 Sheets-Sheet 7

INVENTORS
DONALD B. LUCIUS
BY VIRGIL R. CARPENTER
Dugger Braddock Johnson & Westman
ATTORNEYS

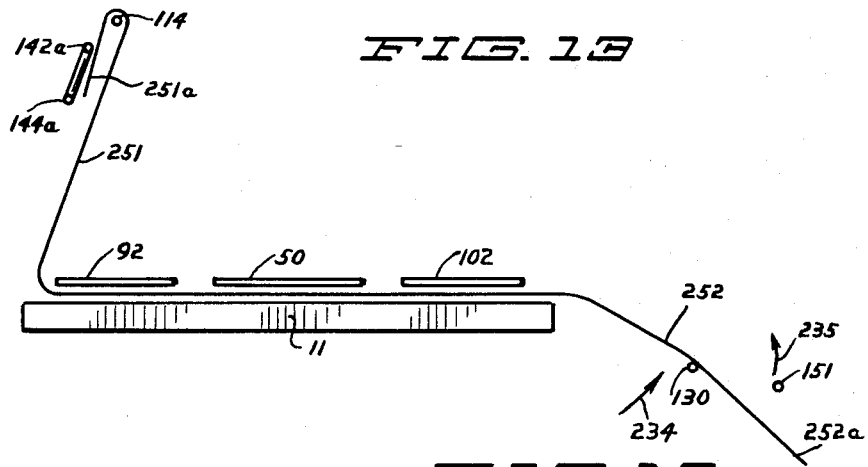
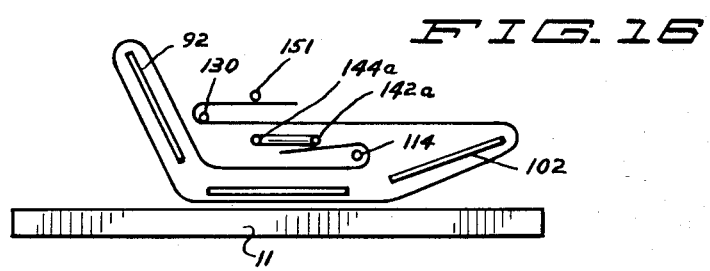
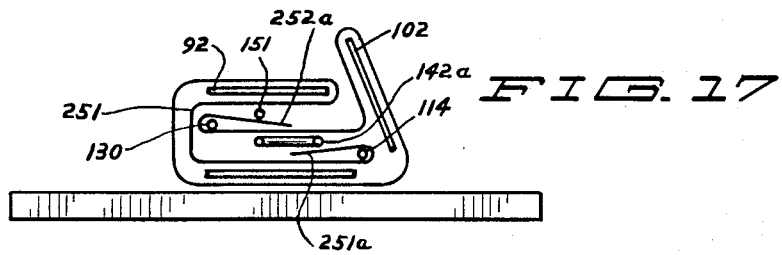
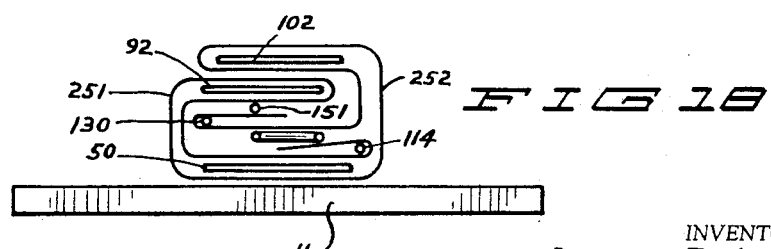

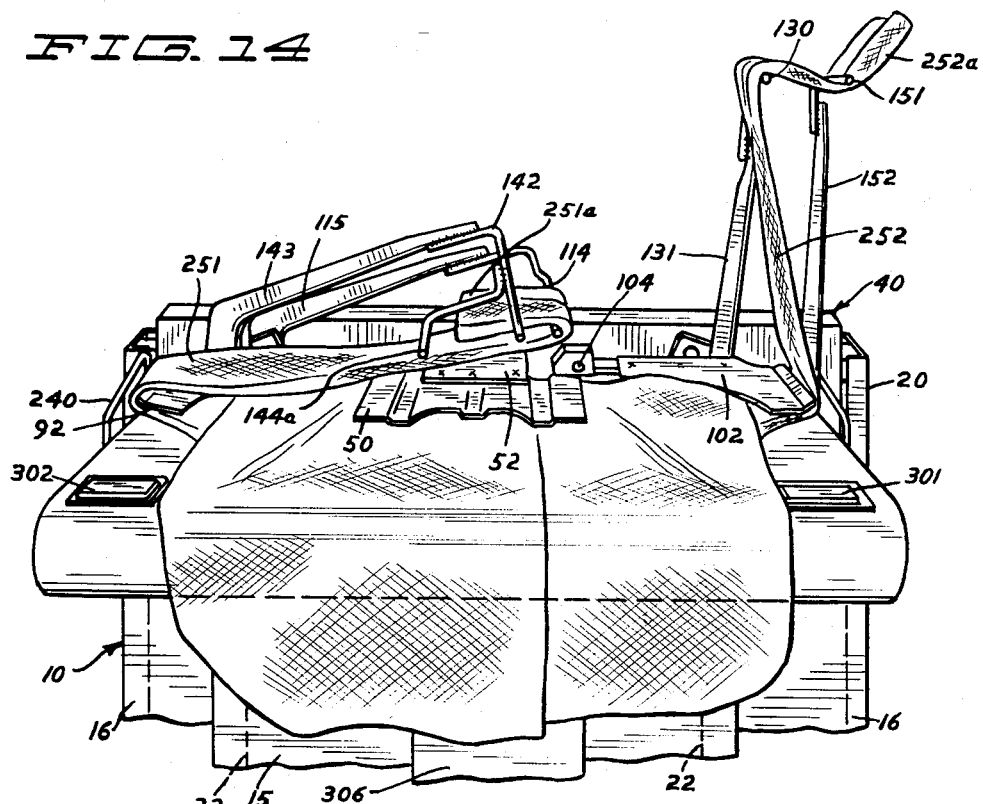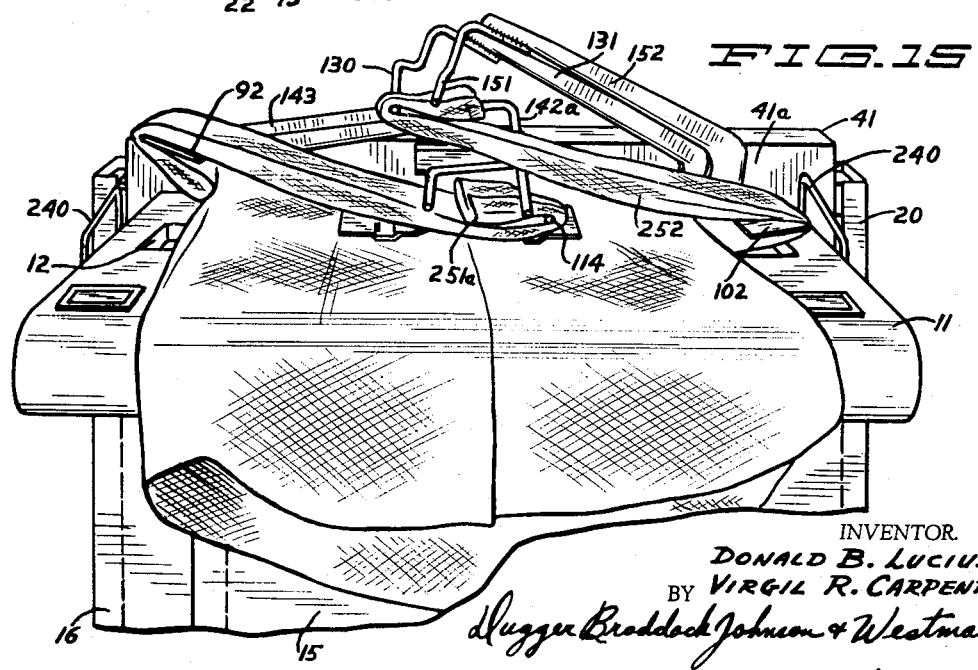

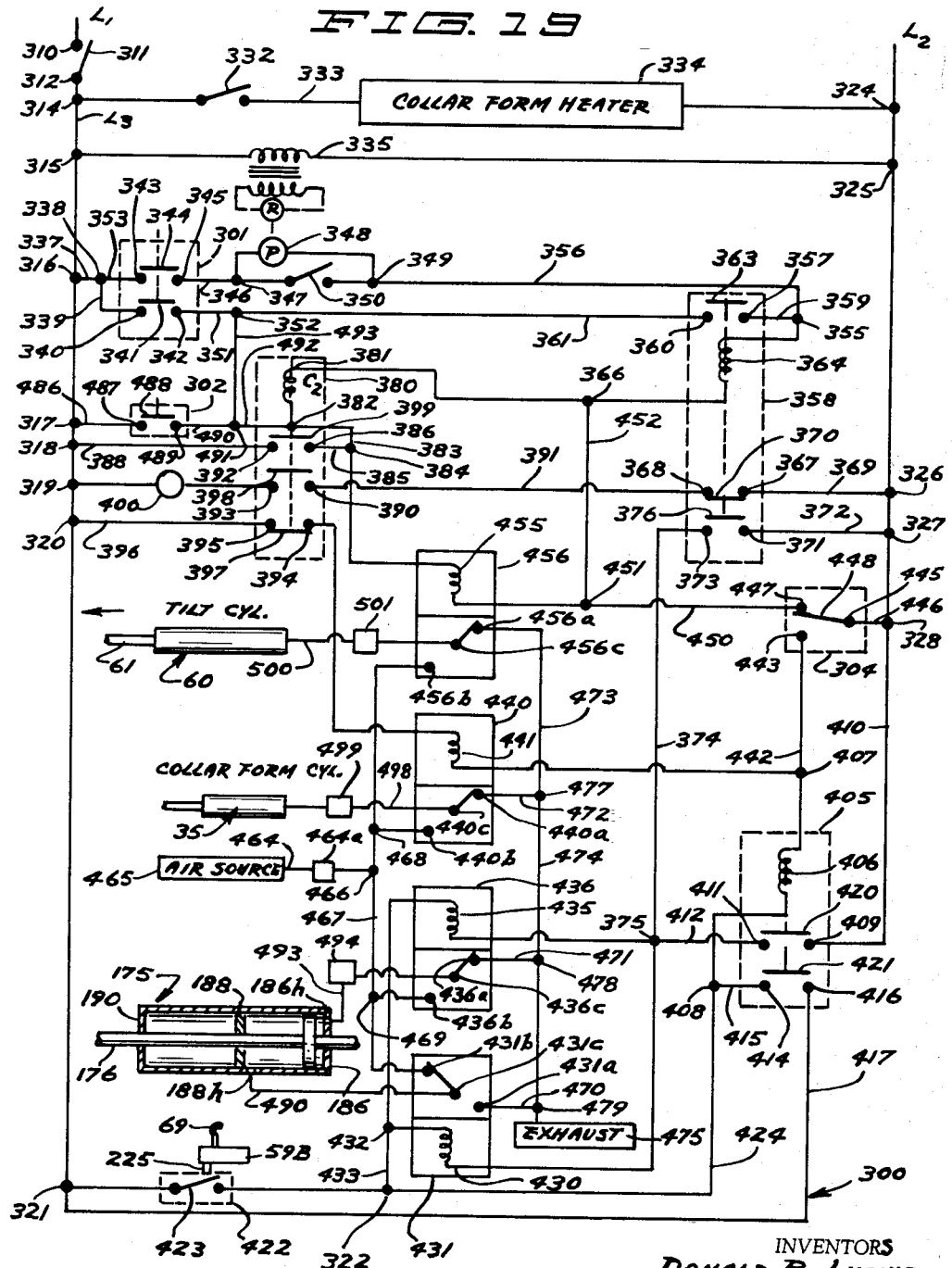

United States Patent Office 3,181,747
Patented May 4, 1965

3,181,747
FOLDING TABLE
Donald B. Lucius, Bloomington, and Virgil R. Carpenter, St. Paul, Minn., assignors to The Unipress Company, Incorporated, Minneapolis, Minn., a corporation of Minnesota
Filed Mar. 18, 1963, Ser. No. 265,830
19 Claims. (Cl. 223—37)

This invention relates to a new and improved shirt folding machine and more particularly to new and novel mechanism in shirt folding machines for insuring that the shirt cuffs are properly folded, mechanism for actuating the shirt folding members and controls therefor.

This invention is directed to substantial improvements in a folding table of the general nature disclosed in U.S. Patent 2,954,908 to Plehal which is assigned to the same assignee as this application. In shirt folding machines of the general nature disclosed in this patent the folding table thereof on occasion folds a shirt in the manner that the cuff is crushed or wrinkled. One reason for this happening is that, for example, when the left sleeve rod imparted a swinging movement to the left sleeve to fold it over the top of the fold plates and the size plate, the left cuff at times comes to rest in an inclined upwardly outwardly position to extend into the path of movement of the right fold plate or bounce upwardly. When this happens sometimes the cuff portion would be properly folded flat; however, at other times upon the right fold plate being swingingly rotated toward a folded position, it would engage the upward outer edge portion of a cuff and instead of folding the entire cuff back flat against the top of the remaining portion of the sleeve it would crush the cuff downwardly toward the table top. Further in prior art shirt folding machines there is the problem of large shirts and/or very long sleeve shirts where if the sleeves thereof are folded by a folding machine, the cuffs are undesirably folded in the midportions thereof. This invention is directed to overcoming problems of the aforementioned nature and additionally to providing improved drive mechanism for the shirt folding members and less complex and less expensive control mechanism therefor.

One of the objects of this invention is to provide new and novel mechanism in a shirt folding machine for positively holding and positioning the cuffs to be reversely bent relative the adjacent portion of the respective sleeve during the folding cycle to preclude the cuffs being wrinkled or crushed during the folding operation.

Another object of this invention is to provide in a shirt folding machine new and novel mechanism that will provide an indication to the operator that a shirt is positioned on the folding table which has sleeves of a length that the shirt will not be properly folded by automatic operation of the folding elements.

A further object of this invention is to provide new and novel drive mechanism in a shirt folding machine for operating the shirt folding members in proper sequence and to minimize the tendency toward binding and play in the connections between the drive mechanism and the shirt folding members. A still further object of this invention is to provide in a shirt folding machine new and novel drive mechanism for the shirt folding members that may be adjustably controlled to control the speed of both the folding operation and unfolding operation. Another object of this invention is to provide less complex control mechanism for insuring the proper sequence of operation of the shirt folding members and that it may be more easily repaired or replaced when necessary.

Other and further objects are those inherent in the invention herein illustrated, described, and claimed, and will be apparent as the description proceeds.

To the accomplishment of the aforegoing and related ends, this invention then comprises the features hereinafter fully described and particularly pointed out in the claims, the following description setting forth in detail certain illustrative embodiments of the invention, these being indicative, however of but a few of the various ways in which the principles of the invention may be employed.

The invention is illustrated by reference to the drawings in which the corresponding numerals refer to the same parts and in which:

FIGURE 2 is a right side elevational view of the structure illustrated in FIGURE 1 with the gear box assembly in a datum position, said view showing an average length shirt sleeve in solid lines and an extra long length shirt sleeve in dotted lines to illustrate utilization of the photoelectric shirt sleeve length measuring mechanism;

FIGURE 3 is an enlarged fragmentary left side view of the shirt folding machine of this invention illustrating the gear box assembly, the shirt folding plates and size plate in a lowered condition prior to actuation of the sleeve folding arms, the panels not being illustrated and portions of the machine broken away to illustrate other structure;

FIGURE 4 is an enlarged fragmentary right side elevational view of the size plate operating mechanism and folding members in a shirt folded position;

Figure 11:
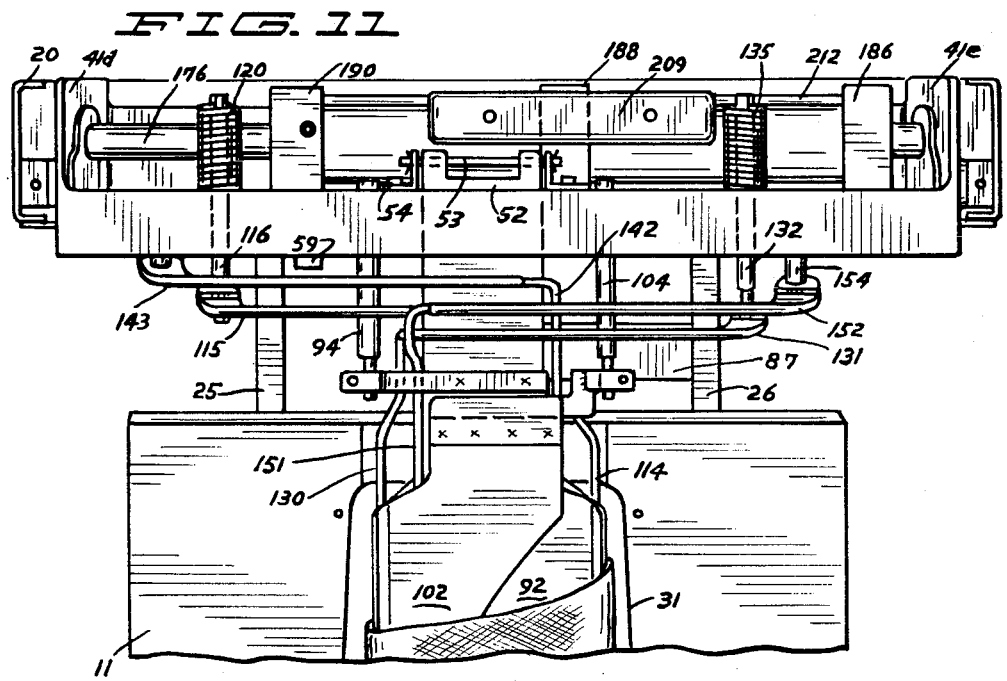
Figure 12:
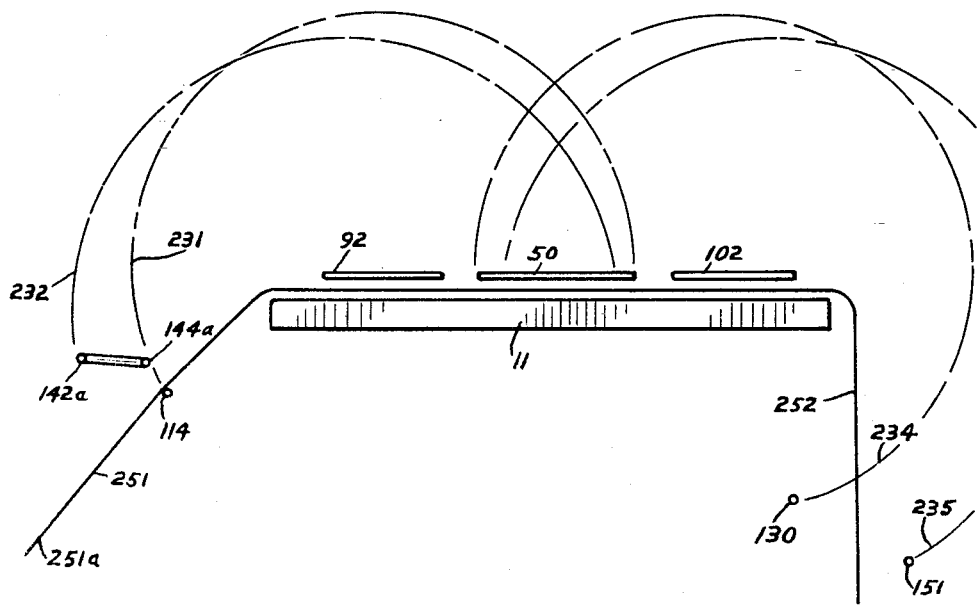

FIGURE 5 is an enlarged fragmentary back elevational view of the shirt folding machine illustrating the gear box tilting mechanism and structure mounted in the gear box, only portions of the gear box piston cylinder assembly being shown. This view illustrates the cam plate in a position prior to the folding arms being actuated, and is generally taken along the line and in the direction of arrows 5—5 of FIGURE 3;

FIGURE 6 is a front elevational view, portions being shown in section, of the gear box assembly, said view being generally taken along the line and in the direction of arrows 6—6 of FIGURE 2, and illustrating the cam plate in the same position as shown in FIGURE 5;

FIGURE 7 is a cross sectional view of a gear box assembly, said view being generally taken along the line and in the direction of arrows 7—7 of FIGURE 6;

FIGURE 8 is a back elevational view of the gear box with its piston cylinder assembly removed, said view showing the gears mounted thereby in a datum condition, the cover being removed;

FIGURE 9 is a view that corresponds to FIGURE 8 other than that it illustrates the gear box assembly piston cylinder combination in cross section taken rearwardly of the gears, said view being generally taken along the line and in the direction of the arrows 9—9 of FIGURE 7;

FIGURE 10 is an enlarged cross sectional view of the left cylinder cap subassembly shown in FIGURE 9 and the casings mounted thereon;

FIGURE 11 is an enlarged fragmentary top, somewhat isometric view of the rear portion of the shirt folding machine, said view being generally taken along the line and in the direction of the arrows 11—11 of FIGURE 3 other than the shirt folding mechanism is shown in a shirt folded condition;

FIGURE 12 is a front diagrammatic illustration of the shirt folding members shortly after the initiation of the shirt folding cycle;

FIGURE 13 is a view similar to that shown in FIG-

URE 12 other than that it is taken at an interval of time shortly after that illustrated in FIGURE 12;

FIGURES 14 and 15 are fragmentary front perspective views of the shirt folding machine of this invention, FIGURE 14 illustrating the position of the shirt folding mechanism a short interval of time later than that diagrammatically illustrated in FIGURE 13, while FIGURE 15 illustrates the position of the shirt folding mechanism a short interval of time later than that illustrated in FIGURE 14;

FIGURES 16–18 are diagrammatic illustrations of the shirt folding operation, said figures progressively showing the sequence of movement of the shirt folding mechanism at intervals of time subsequent to that illustrated in FIGURE 15; and FIGURE 19 is a schematic illustration of the air and electric control circuitry of a folding machine of this invention, said view also showing various component parts of the machine.

Referring now in particular to FIGURES 1–3, 5, 11, 14 and 15 there is illustrated the shirt folding machine of this invention, generally designated 10, that comprises a mildly slanted table top 11 which is provided with a transverse trough 12 for containing a stack of sealing bands. The specific construction of the supporting framework, generally designated 14, for the table top is not important to understanding of the principle underlying invention and accordingly it will not be described in detail. However it is to be mentioned that the framework includes a front panel 15, right side and left side panels 17, right and left front panel portions 16 rearwardly of panels 17, and a back panel (not shown). As will be described hereinafter, the left shirt sleeve 251 is intended to be dependingly draped over the table top transversely outwardly of the left side panel and the right shirt sleeve 252 over the table top transversely outwardly of the right side panel prior to initiating the folding operation. At the rear end of the machine are two oppositely faced upright channels 20 having a transversely extending upper cross brace 21 secured to said channels and a corresponding bottom brace (not shown). At the front of the end of the machine there are provided oppositely faced upright front channels 22 and transversely extending upper and lower cross braces 23 mounted by channels 22, only the upper cross brace 23 being shown. Extending between transverse cross braces 21 and 23 are the longitudinal cross braces 25 and 26 to in conjunction with braces 21 and 23 form a rectangular frame. Mounted on the braces 25 and 26 more closely adjacent the channels 20 than the channels 22 are short upright channels 27 and 28 respectively. The table top is secured to the upper ends of the upright channels 22, 27 and 28 such that the rearward edge of the table is located a substantial distance forwardly of the rear channels 20, panel portions 16 being mounted to extend between channels 20 and the respective channels 27 and 28.

A collar formed assembly, generally designated 30, is mounted in depending relationship to the table top to be disposed in the opening 31 that is provided in said table top. Although the collar formed assembly will not be described completely it will be noted that it includes a front block 32 and a pair of side blocks 33.

These three blocks are movable outwardly to a spread apart position relative to one another through the provision of the spring 34 and are resiliently urged to said position by said spring which has one end attached to the frame 14 and an opposite end attached to the moveable linkage member 36, said blocks being movable inwardly closely adjacent one another through the provision of the collar form piston cylinder combination 35 that has its piston rod connected to the same linkage member. When no air under pressure is applied to the cylinder 35, the spring 34 resiliently urges the three blocks through conventional mechanism to an expanded datum condition. The apparatus for applying air under pressure to a cylinder 35 during a predetermined portion of the operating cycle will be set forth hereinafter.

Pivotally mounted between the upper ends of the channels 20 is a gear box assembly, generally designated 40 (see FIGURES 6–11). The gear box assembly includes a generally box shaped housing or gear box 41 that has integrally formed front wall 41a, top wall 41b, bottom wall 41c, left side wall 41d, and right side wall 41e together with a generally U-shaped, removable cover 41f. The upper ends of the channels 20 are provided with flange bearing members 48 which serve as pivots in which the stud rocker shafts 49 are journalled, said rocker shafts in turn being connected to the respective side flange of the gear box 41 to render it tiltable about a horizontal axis transverse in respect to the machine.

Carried by the gear box 41 is a size plate 50 about which the shirt is folded, said size plate having an arcuate slot 51 to facilitate the withdrawal of a folded shirt longitudinally extending, and depressed grooved portions 50a, 50b and 50c that serve as reinforcing ribs and into which longitudinal portions of shirt folding rods are moved as will be described hereinafter. The size plate includes a longitudinally extending mounting plate 52, said plate 52 extending rearwardly through a rectangular slot 41g formed in the upper central portion of the front wall 41a of the gear box (see FIGURE 5). The rearward end of the plate 52 is pivotally mounted on a transverse pivot shaft 53, said shaft being mounted by a pair of right angle brackets 54 which in turn are bolted to the respective adjacent depending flanges 55 or 56 (see FIGURE 8). The flanges 55 and 56 are joined to the rearward edge of the top wall 41b to depend therefrom and provide a notch through which the mounting plate extends.

In order to move the size plate 50 from an elevated datum position spaced above the collar form assembly and the shirt as illustrated in FIGURE 2 to a lowered position closely adjacent the shirt as per the FIGURE 3 position, the gear box is tilted from the FIGURE 2 position to the FIGURE 3 position. The structure for tilting the gear box about stud shafts 49 between the aforementioned positions includes a downwardly extending arm 59 that is made up of a first arm portion 59a that is at its upper end bolted to the front wall of the gear box by bolts extended through slots (see FIGURE 6) to permit vertical adjustment of portion 59a and a lower arm portion 59b welded to arm portion 59a to depend therefrom. (See FIGURES 3–5.) The tilt piston cylinder assembly 60 includes a piston rod 61 having a bifurcated end portion pivotally connected to the arm portion 59b by a pivot 62, said assembly also including a cylinder 63 that is pivotally connected at its forward end to the adjustment member 58 by pivot 65, member 58 in turn being connected to the inner end of transverse bracket 65. The outer transverse end of the bracket 64 is welded to a forward portion of the longitudinal channel 25. Upon applying air under pressure to the forward end of the cylinder 63 the piston rod 61 is moved in the direction of the arrow 66 to cause the gear box to be pivoted in the direction of arrow 67 about shafts 49 (see FIGURE 3) and thereby move the size plate and shirt folding members from the datum position to a lowered position as in FIGURE 3. In order to pivot the gear box in the direction opposite arrow 67 to again move the size plate to the datum position there is provided a coil spring 68 that at its forward end is connected to the upper front channel 23 and at its rearward end is hooked on a hook bolt 69. The rearward threaded end of the bolt 69 is extended through appropriate aperture formed in the lower end portion of the arm, 59, nuts 73 being threaded on the hooked bolt to prevent said bolt being moved relative arm 59. As may be noted in FIGURE 3 coil spring 68 is connected to the arm 59 to provide a longer lever arm than effectively provided by the connection of the piston cylinder assembly 60 to said arm.

In order to assure a good pressural engagement of the size plate with the shirt to be folded when the gear box is tilted to the shirt folding members lowered position of FIGURE 3, a tilt clevis 70 has a bifurcated upper end pivotally connected to a lug 71 by pivot pin 72 (see FIGURES 6 and 8). The lug 71 is welded to the mounting plate 52 a slight distance forwardly of the pivot shaft 53. The lower bifurcated end of the tilt clevis 70 is pivotally connected to the tilt plate 74 at 75, the tilt plate in turn being pivotally connected to the lower end of the tilt plate bracket 76 at 77. The central portion of the bracket 76 in turn is bolted to the lower front central portion of the front wall 41a of the gear box. In order to resiliently retain the tilt plate in the datum position of FIGURE 2 one end of coil spring 78 is attached to the upper end of the bracket 76 by a stud bolt while the opposite end of the spring is attached to the tilt plate by a stud bolt 79 located intermediate the pivots 75 and 77. Due to the provision of the coil spring 78, the tilt plate is constantly resiliently urged to pivot about pivot 77 in the direction of arrow 80 to constantly urge the tilt clevis 70 in an upward direction (arrow 81) to urge the mounting plate and size plate attached thereto to an elevated position. The upward movement of the size plate is limited by the resilient mounts 83 dependingly mounted top wall 41b to abut against plate 52.

In order to firmly move the size plate into tight pressural condition with the shirt on the table as the gear box is being tilted to a size plate lowered position, the lower front end of the tilt plate is provided with a roller 85 that is positioned to abut against the upwardly extending leg of the right angle bracket 86, the leg of said bracket being welded to the inner end of a transverse mounting bracket 87. The opposite end of the mounting bracket 87 is welded to the longitudinal cross brace 26 (see FIGURE 1).

As may be noted in FIGURE 2 when the gear box is in a datum position, the roller 85 on the tilt plate is located a substantial distance forwardly of the vertical leg of the bracket 86. However upon applying pressurized air to the tilt cylinder 60 the gear box is pivoted about the stud shafts 49 in the direction of the arrow 67. The initial pivotal movement of the gear box does not result in the size plate being moved relative to said box since the coil spring 78 retains the tilt plate whereby the clevis rod holds the mounting plate against the resilient mounts extending downwardly in the rectangular notch 41g. Upon the gear box being pivoted in the direction of arrow 67 sufficiently to bring the roller 85 in contact with the bracket 86 said roller is no longer free to move in a generally rearward direction. As a result subsequent movement of the gear box causes the tilt plate to be pivoted about pivot 77 in the direction opposite arrow 80 relative the gear box. This movement of the tilt plate lowers pivot 75 relative to the gear box and roller 85 along the vertical leg of bracket 86 to thereby move the clevis rod in a direction opposite arrow 81. In order to preclude the front wall of the gear box interfering with the resulting movement of the clevis rod there is provided with a generally rectangular notch 41h through which the central portion of the clevis rod may extend. The roller 85 causes the tilt plate to move the size plate into pressural contact with the shirt on the table top during the tilting movement of the gear box. At the time the size plate makes such pressural contact further pivotal movement of the gear box in the direction of the arrow 67 is stopped through the provision of a stop (not shown) built in cylinder 60 and through appropriate adjustments of the length of the clevis rod, the length of piston rod 61, the vertical position of arm portions 59a relative the gear box, the spacing of the forward end of the cylinder 63 from the bracket 64 and a control to be described hereafter.

When the pressurized air from the cylinder assembly 60 is exhausted, the coil spring 68 takes over to pivot the gear box in the direction opposite arrow 67. If the fold plates have not moved to a folded condition or after they are moved from a folded condition, then at this time the pivot 77 is moved in the same direction and as a result the coil spring 78 causes the tilt plate to pivot in the direction of arrow 80 relative the gear box to thereby move the size plate in an elevating direction relative the gear box. This movement continues until the gear box has been sufficiently pivoted so that the mounting plate 52 moves into contact with the resilient mounts and thereafter any further return movement of the gear box results in the roller 85 moving away from the vertical leg of bracket 86.

Figure 1:
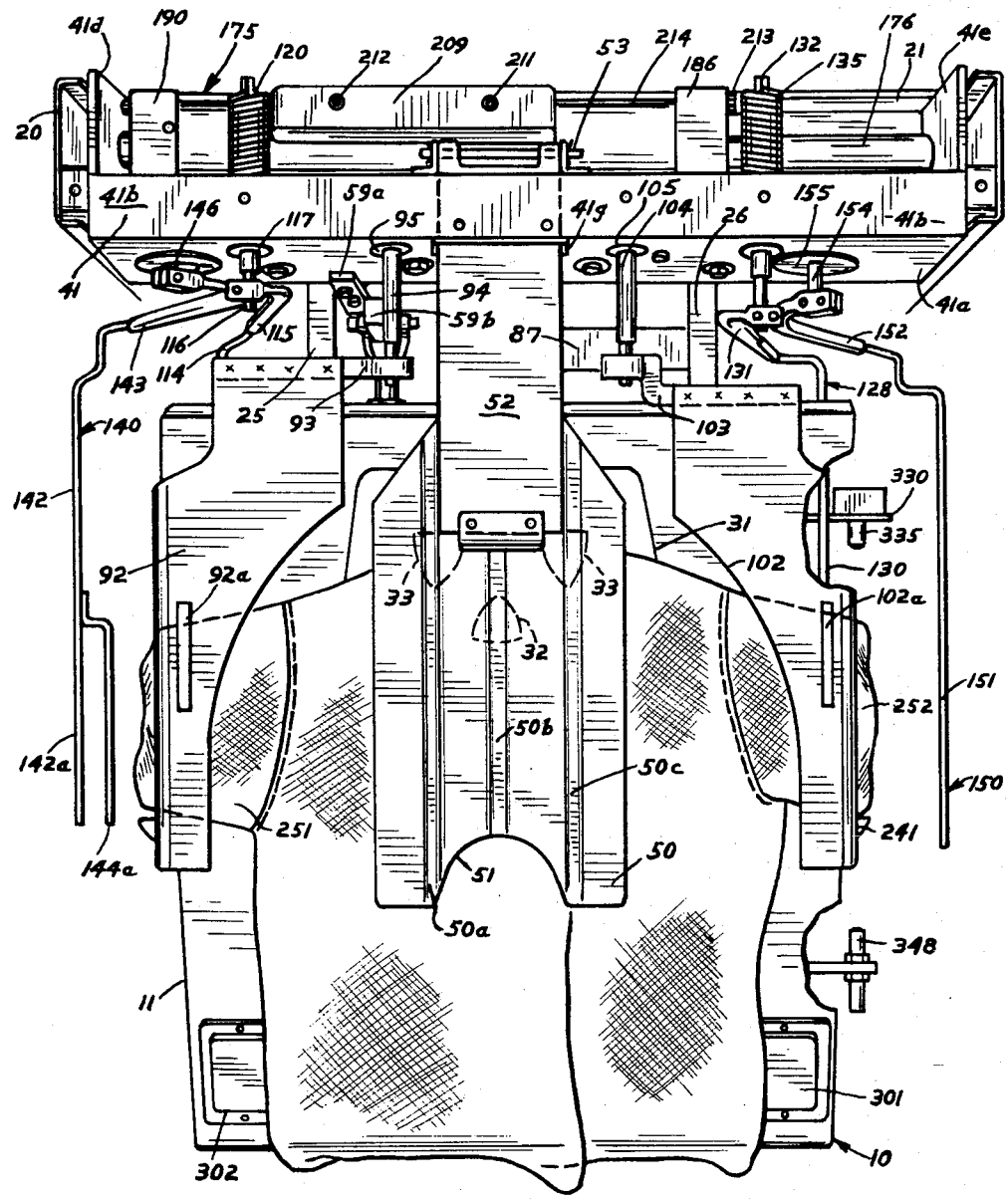
FIGURE 1 is a top, somewhat isometric view of a shirt folding machine of this invention with portions of the table top and one folding plate broken away to illustrate part of the electric eye assembly, said view illustrating the gear box assembly in a datum position and a shirt positioned on the table top in condition to be folded.

Referring now in particular to FIGURES 1, 8 and 11 there is illustrated a shirt folding plate 92 that at its rearward edge is riveted to the radially extending arm 93. The inner end of arm 93 is clamped to the forward end of the shaft 94, shaft 94 being journalled in a bearing member 95 mounted on the gear box front wall 41a and a second bearing mounted in the dependent flange 56. Keyed to the portion of the shaft 94 intermediate flange 56 and wall 41a is a small tooth gear 97 that is located to be driven by a larger tooth gear 98. The gear 98 is rotatably mounted on a stud bolt 99 extended through the wall 41a and mounted therein. In this connection it is to be mentioned gear 98 and each other gear that is described hereinafter and mounted in the gear box is provided with a bearing and that a land is provided into which the stud bolt is extended in order that the gear 98 and other such gears are freely rotatable. A roller or cam follower 100 is rotatably mounted on a stud bolt 101 which in turn is threaded into the gear 98 radially outwardly of the stud bolt 99 (see FIGURE 8).

Likewise a right shirt folding plate 102 is riveted to a radial arm 103 that at its inner end is clamped to the forward end of a shaft 104. The shaft 104 in turn is journalled for rotation in bearings 105 mounted in the wall 41a and depending flange 55. A small gear 106 is keyed on shaft 104 in intermeshing relationship with the larger gear 107, gear 107 being journalled for rotation on the stud bolt 99 mounted in wall 41a. A roller or cam follower 108 is bolted to the large gear 107 to rotate about an axis radially outwardly of the axis of rotation of gear 107.

As may be noted from FIGURES 1 and 8 the shafts 94 and 104 are located closely adjacent but on opposite ends of the notch 41g, the axis of rotation of shaft 94 being substantially in a plane common with the axis of pivotal movement of the size plate 50 while the axis of rotation of shaft 104 is only a fraction of an inch below said plane. Further since gears 97 and 106 are of the same shape and size, and gears 98 and 107 are likewise of the same shape and size; and due to the positioning of the axes of rotation of the aforementioned gears, upon gears 98 and 107 being rotated in a common direction the same amount, shafts 94 and 104 will be rotated in opposite directions equal angular amounts. The structure for driving gears 98 and 107 will be set forth hereinafter.

A first shirt folding arm 112 is mounted to rotate about an axis intermediate the axis of rotation of shaft 94 and gear box wall 41d, said arm including a sleeve rod 114 that at one end is welded to the lower end of the mounting arm 115, the opposite end of arm 115 being clamped to the forward end of the shaft 116. The shaft 116 is rotatably supported by bearing members 117 located in the gear box wall 41a and a lug 118 dependingly joined to the back edge of the top wall 41b. As may be noted in FIGURES 1 and 5 the shaft 116 extends rearwardly of the lug 118 and its rearward end is slotted to receivingly hold one end of the coil spring 120. The opposite hooked end of the coil spring is held in a fixed position by a bolt 119 threaded into the lug 118, the spring 120 being coiled around a spacer 125 on shaft 116.

A small gear 121 is keyed to the shaft 116 intermediate lug 118 and front wall 41a in intermeshing relationship with the large gear 122 that is rotatably mounted within the gear box housing by a stud bolt 123. A roller or cam follower 124 is rotatably bolted to the gear 123 radially outwardly of its axis of rotation.

A second sleeve folding arm 128 is likewise mounted on the gear box in a corresponding position to the first shirt sleeve folding arm but on the opposite side of the size plate 50, said second sleeve folding arm including a sleeve rod 130 that is welded to the outer end of mounting arm 131. Arm 131 is clamped to shaft 132 which is journalled for rotation in the front wall 41a and lug 134 on wall 41b by bearing members 117. The rearward end of the shaft 132 is provided with a spacer and a coil spring 135 that is mounted on said shaft the same way as the coil spring 120 mounted on shaft 116 other than that the spring 135 tends to rotate shaft 132 in a direction opposite that spring 120 tends to rotate shaft 116.

A small gear 136 is keyed to shaft 132 intermediate lug 134 and wall 41a in intermeshing relationship with a large sector gear 137 that is rotatably mounted on a stud bolt 123. A roller 138 is rotatably bolted to the sector gear in a positive radially outwardly of the axis of rotation of said sector gear. When the gears 122 and 137 are rotated the same direction by the same angular amounts the small gears 136 and 121 are rotated equal angular increments but in opposite directions to one another.

A third sleeve folding arm 140 is mounted on the same side of the machine as the first sleeve folding arm but to rotate about an axis intermediate the axis of the shaft 116 and the side wall 41d, and also at a lower elevation than the axis of rotation of the shaft 116 when the gear box assembly is in a lowered position. The third sleeve folding arm includes a sleeve rod 142 that at its inner end is welded to the outer end of the mounting arm 143. As may be noted in FIGURES 1 and 3 the sleeve rod 142 throughout the elongated forward portion 142a thereof is substantially straight. To the central part of longitudinal portion 142a there is welded the rearward end portion of a prong 144, said prong being bent to extend radially relative to portion 142a and then bent to extend parallel to the sleeve rod portion 142a and in substantial spaced relation thereto along portion 144a. As a result of the size and shape of the members 142–144 when portions 142a and 144a are in a datum position, portion 144a is located at a substantially higher elevation than portion 142a.

The inner end of the mounting arm 143 is clampingly attached to the forward end of the stud shaft 145 that is journalled for rotation in a bearing member 146 that is mounted in the front wall 41a. The stud shaft extends into the gear box housing and has keyed thereto a tooth gear 147 that is in intermeshing relationship with gear 122; gear 147 being of a larger diameter than gear 121 but of a substantially smaller diameter than gear 122.

On the right hand side of the machine there is provided a fourth sleeve folding arm, generally designated 150, that is mounted to rotate about an axis parallel to the axis of rotation of shaft 145, the axis of rotation of the fourth arm being located intermediate side wall 41e and the axis of rotation of the shaft 132 but at substantially lower elevation than the last mentioned shaft. The arm 150 includes a sleeve rod 151 that at its rearward end is welded to the lower end of the mounting arm 152, arm 152 being clamped to the forward end of stud shaft 154 to rotate therewith. The stud shaft 154 is journalled for rotation in a bearing member 155 that is mounted in the front wall 41a. On the rearward end of stud shaft 154 there is keyed a gear 156 in intermeshing relationship with the sector gear 137, gears 147 and 156 being substantially the same size.

In order to operate the two shirt folding plates and the four shirt folding arms in proper sequence from the lowered unfolded position of FIGURE 3 to a shirt folded position of FIGURE 11 there is provided a generally rectangular cam plate 161 for driving gears 98, 107, 122, 137 in proper sequence to sequentially drive the gears mounted on the shirt folding plate and sleeve folding arm shafts in a manner to be described hereinafter. The cam plate 161 as illustrated in FIGURE 5, the gears driven thereby as illustrated in FIGURES 5 and 8 and the gears and cam plate 161 as illustrated in FIGURE 6 are in a shirt unfolded condition which is the same as the datum position of FIGURE 2 other than for the tilting movement produced through the tilting movement of the gear box. For purposes of facilitating the description of the cam plate and the structure which drives the cam plate, the description will refer to the left side as viewed from the front (FIGURE 6) even though the "left" structure appears in the right hand side of FIGURES 5, 8 and 9. The right portion of cam plate 161 is provided with an elongated slot 162 that receives the roller 134, said slot opening to the right vertical edge of the cam plate. At the time the cam plate is in a datum position the roller extends almost halfway out of the slot (see FIGURE 5). The slot 162 includes a first horizontal portion 162a located vertically intermediate the horizontal edges of the plate, said portion extending a short distance toward the left side of the machine and thence extending through an inclined portion 162b that extends to the left and downwardly. The opposite end of the inclined portion opens to an elongated generally horizontally extending portion 162c, the left half of portion 162c being horizontal while the right half is slightly upwardly curved in a right hand direction until it intercedes portion 162b. The overall horizontal length of the slot 162 is approximately one third of the length of the cam plate.

In the central portion of the cam plate there is provided a second elongated slot 164. The right horizontal end portion 164a of the slot 164 is located at a higher elevation than the slot portion 162a and in part directly above slotted portion 162c. The left end of slotted portion 164a opens to the inclined portion 164b that extends in a leftwardly and downwardly inclined direction to a slightly lower elevation than the slotted portion 162a. The length and angle of inclination of the slotted portions 164b, 162b are approximately the same. The lower end of slotted portion 164b thence opens to a central horizontally extending slotted portion 164c, the other end of the slotted portion 164c opening to the upwardly inclined portion 164d that is substantially the same length as slotted portion 164b but oppositely inclined. The slotted portion 164d in turn opens to the elongated horizontally slotted portion 164e that is at the same elevation as the slotted portion 164a, the horizontal spacing between rollers 101 and 108 being substantially the same as the horizontal distance between roller 101 and the left end of slotted portion 164e. The overall horizontal length of the slot 164 extends about one half of the total length of the cam plate. When cam plate is in a datum position or a datum gear box lowered position, the roller 108 is located in the right end portion of slotted portion 164a while the roller 101 is located in the slotted portion 164c closely adjacent inclined portion 164b.

In the right end portion of the cam plate there is provided a third slot 166, said slot having a leftwardly and upwardly inclined slotted portion 166a that extends to a slightly higher elevation than the slotted portion 164c and a substantially lower elevation than the slotted portion 162a. Slotted portions 166a, 162b are of the same length but oppositely inclined. The slotted portion 166a is located below slotted portion 164e and opens to the generally horizontal elongated portion 166b that in turn opens to the left edge of the cam plate, slotted portions 162c and 166b being approximately the same length. The left half of portion 166b is horizontal, however the right half is slightly progressively downwardly curved in a direction toward slotted portion 166a to intercede said portion 166a. When the cam plate is in a datum position the roller 124 is located in the right end of portion 166a.

As may be noted in FIGURE 5 the horizontal center line of slotted portion 162a is located slightly above the axis of rotation of the sector gear 137 while slotted portion 162c is located at an elevation a substantial distance below said axis of rotation. The center line of slotted portion 164a is located at a slightly higher elevation than the axis of rotation of gear 107 while slotted portion 164c is located at an elevation substantially lower than the axes of rotation of gears 98 and 107. With reference to the center line of slot 166 the slotted portion 166b center line is located at a higher elevation than the axis of rotation of gear 122 while slotted portion 166a center line extends to a lower elevation than said axis of rotation. Due to the relative dimensions of the gears and the size and configuration of the slots the movement of the sleeve folding arms and the shirt folding plates will be properly sequenced to fold a shirt (as will be described hereinafter) as the cam plate is translated in the direction of the arrow 207 from the FIGURE 5 position to a position that the roller 124 extends approximately one half of its diameter beyond the right hand edge of the cam plate as viewed in FIGURE 5. During this translatory movement of the cam plate, the roller 134 will move through the slot 162 to a position closely adjacent the left end of said slot 162 while roller 108 will move in the slot 164 to substantially the same position illustrated in FIGURE 5 for roller 101. At the same time roller 101 is moved to the left end of slot 164 while roller 124 is moved in slot 166 to be adjacent the left vertical edge of the cam plate. To be noted is that a reinforcing strip 163 is attached to either end portion of the cam plate to extend rearwardly of said plate and in positions not to interfere with rollers 134, 124 moving in the respective slot while in the front wall 41a there are provided kidney shaped recesses into which the bolts for mounting rollers 101, 108, 124 and 134 extend (see FIGURE 6).

For purposes of mounting the cam plate 161 and reciprocating it between the aforementioned positions there is provided a folding or gear box piston cylinder assembly, generally designated 175 (see FIGURES 5, 7, 10 and 11). The assembly 175 includes a piston rod 176 that extends between the lands 177 formed on the gear box side walls 41e and 41d, there being a bolt 178 extended through apertures in each of the side walls and lands to be threaded into the respective end of the piston rod. As may be noted from FIGURE 7 the piston rod is somewhat centrally located with reference to the hollow interior of the gear box. Fixedly positioned on the piston rod approximately one-third of the distance from side wall 41e to the side wall 41d is a piston generally designated 179 that includes a washer 180, an O-ring (not shown) intermediate the washer and the piston rod, two oppositely faced resilient piston cups 181, one piston cup being located on either side of the washer 180, a washer 182 located in the confines of the annular flanges of each of the piston cups 181 that bears against the respective piston cup, spacers 183 that bear against each of the washers 182 and a retainer ring 184 for each of the spacers for holding the element 180–184 in abutting relationship in a fixed position on the piston rod 172 as shown in FIGURE 9.

The assembly 175 includes a right hand cap subassembly 186 (left hand side of FIGURE 9), a center cap subassembly 188, and a left hand cap sub-assembly 190. The sub-assembly 186 includes a generally rectangular block 186a having a central horizontal bore 186f through which the piston rod extends, said bore being of a substantially larger diameter than the piston rod. Mounted within the bore to form a sealing fit with the block and a sliding sealing fit with the piston rod is a metal seal ring 186b. An end plate 186d is attached to left end of the block and has a central aperture of only a slightly larger diameter than the piston rod which is extended therethrough. Located in bore 186f intermediate the end plate and the seal ring 186b is a resilient seal ring 186e.

The opposite end of block 186a is provided with a rounded shoulder 186g for mounting one end of the cylinder casing 191, the shoulder being provided with a peripheral groove to mount an O-ring to form a sealing fit between the shoulder and the casing. The opposite end of the cylinder casing is similarly mounted on the rounded shoulder 188g of the block 188a of the subassembly 188. The block 188a is provided with a horizontally extending bore 188f through which the piston rod 176 extends, there being a resilient, U-cup packing ring 186e and retainer rings therefor mounted in the bore to form a sealing fit with the right end of block 188a and a sliding sealing fit with the piston rod. The piston 179, piston rod 176, cap sub-assembly 186, cylinder casing 191, and the adjacent portion of the cap sub-assembly 188 forms a two-way acting pneumatic piston cylinder combination, block 188a being provided with a port 188h that opens into the cylinder casing on one side of the piston while the block 186a is provided with a port 186h that opens into the bore 186f and accordingly opens into the cylinder casing 191 on the opposite side of the piston from port 188h. It is believed it is apparent from the preceding description that the piston rod 176 and piston 179 are stationary while the remaining portion of the pneumatic piston cylinder combination described in the preceding sentence is mounted for translatory movement relative to said piston 179.

In order to control the speed of reciprocation in a shirt folding direction and to serve as a cushion at the ends of the pneumatic cylinder stroke, the assembly 175 also includes a hydraulic piston cylinder combination. The hydraulic piston cylinder combination includes the opposite end portion of the block 188a which mounts two axially adjacent U-cup packing rings 188d and their retainer rings rings 188d being of the same construction as ring 188e and mounted as will be more fully described relative subassembly 190. To be noted is that intermediate the seal rings 188d and the seal ring 188e of the pneumatic piston cylinder combination there is provided a radially extending bore 188k that opens to the bore 188f to provide an oil and air breather, the rings 186e and 188d being spaced to provide an annular space around the piston rod into which bore 188k opens. The left portion of bore 188f provides an internal shoulder for mounting a metal seal ring 188c and then a second diametrically enlarged shoulder for mounting the inner cylindrical casing 201 which is of a substantially smaller diameter than casing 191.

The block 188a is also provided with a second externally rounded shoulder 188i for mounting one end of the outer cylindrical casing 202 concentric to the casing 201, the casing 202 being of the same diameter as casing 191. The casing 201 is provided with a bore 201a and an axially spaced fluid passageway 201b that places the interior of casing 201 in fluid communication with the annular space 207 between casings 201 and 202, bore 201a being located closely adjacent the left hand end of block 188a.

A piston 203 is mounted on the piston rod 176 to be retained in a fixed location thereon by retainer rings so as to be to the right of passageway 201b when the assembly 175 is in a datum position, the passageway 201b being located an axial dimension from seal ring 188c that is greater than the axial dimension of piston 203. The piston 203 is of a slightly smaller diameter than the internal diameter of the casing 201 in order to provide an annular clearance 204 between the piston and casing 201. Reasons for providing such a clearance will become more apparent hereinafter.

Referring now in particular to FIGURE 10, the construction of the left cylinder cap sub-assembly 190 will be described. The subassembly 190 includes a generally rectangular block 190a having a groove through which the adjacent strip 163 extends, a horizontally extending central bore 190f that is provided with a first internal shoulder for mounting a metal seal ring 190c and a larger diametric internal shoulder for mounting one end of the cylindrical casing 201. The block 190a has an external rounded shoulder 190i for mounting one end of the casing 202 concentric to casing 201 and a bore 190e that at one end opens to the annular space between casings 201 and 202 and at the opposite end opens to the radial bore 190k. The bore 190k opens into the bore 190f intermediate the end of casing 201 and seal ring 190c, bore 190k being provided with a valve seat intermediate bores 190e and 190f. A needle valve assembly 205 is mounted in the bore 190k to be adjustably positioned in order to adjustably control the rate of flow of liquid through the fluid channel 190e, 190k between the annular space 207 and the interior of casing 201.

Also mounted in the bore 190f to provide a sealing fit between said bore and the piston rod in a manner similar to that described with reference to block 188a are a pair of resilient, generally U-cup packing rings 190d, there being provided retainer rings and backs up rings in contact with the web portions of rings 190d to hold rings 190d in place as illustrated in FIGURE 10. The packing rings 190d function similar to the packing rings 188d. As may be noted in FIGURE 9 an annular space is provided between the block 190 and piston rod 176 axially intermediate the metal seal ring 190c and the pair of packing rings 190d. The block is provided with a fluid passageway 190n that at one end opens to the last mentioned annular space and at the other end opens to the annular space 207. The last mentioned passageway serves to prevent pressure build up between ring 190c and rings 190d by providing for liquid return to annular space 207 when casings 201, 202 are being reciprocated in the direction of arrow 208 relative to the piston rod.

In order to mount a generally rectangular box shaped oil reservoir 209 on the casing 202 and place it in fluid communication with the annular space 207 there is provided a tubular connector 210 that is at one end welded to said reservoir and at the other end to the upper midportion of casing 202 (see FIGURES 1, 9 and 11). A port in the reservoir 202 opens through the tubular connector to a similar port provided at one end of the oil reservoir. The oil reservoir has a filling plug 211 and a breather plug 212.

In order to retain the cap sub-assemblies 186, 188 and 190, and the cylinder casings 191, 201 and 202 in the above described assembled relationship, there are provided a plurality of rods 214 that are extended through appropriate apertures formed in the cap sub-assemblies. The rods are threaded at their ends for receiving nuts 213.

As may be noted from FIGURE 5 the cam plate 161 is of a length such that its left hand vertical edge is located closely adjacent the corresponding edge portion of the cap sub-assembly 190 while the right hand vertical edge is located to the right of the corresponding edge of the assembly 186. The cam plate 161 is located longitudinally intermediate the gears in the gear box housing and the assembly 175, the cam plate being attached to the adjacent vertical surfaces of cap sub-assemblies blocks 186a, 188a and 190a by cap screws 216 (see FIGURES 6 and 7). To minimize any tendency of the respective rollers and cam plate binding due to the cam plate being located off-center of the central axis of movement of said cylinder casings 191, 202, a pair of longitudinally spaced upright bosses 217 having threaded studs 218 mounted therein are provided in the bottom wall 41c, (see FIGURES 5, 7 and 8). The aforementioned studs have an upper surface on which the lower horizontal edge of the cam plate rides and at their lower ends are provided with lock nuts 219 for holding studs in an adjusted position. By appropriately adjustably positioning the aforementioned studs, the tendency of the rollers to bind in the cam slots in which they ride is minimized.

The structure of the gear box assembly and the structure carried thereby having been described, the shirt folding machine control mechanism, generally designated 300, will now be set forth. The mechanism 300 comprises a plurality of manually operated control switches including a right hand switch 301 mounted on the lower front corner of the table top, and a left hand control switch 302 mounted on the lower left hand corner of said table top. Switches 301 and 302 are of the type that are constantly resiliently urged to an "OFF" position; however, upon being depressed, are moved to an "ON" position. Additionally, there are provided a number of manually operated switches on the switch box assembly 306 that upon being moved to an "ON" position will remain in that position until they are moved to an "OFF" position, assembly 306 being mounted on the front panel 15 (see FIGURES 2 and 14). Further there is provided at the front of the machine a foot pedal switch 304. The aforementioned switches are connected by electrical circuitry to electrical components, that will be described hereinafter, in the control box 226 mounted on the back portion of the machine by a bracket 227 attached to brace 25 and by being attached to brace 21.

Referring now in particular to FIGURE 19, power is supplied to the shirt folding machine of this invention through a pair of main lines L-1, L-2, line L-1 being connected to the first terminal 310 of the main ON-OFF switch 311, that includes a second terminal 312. Electric line L-3 is connected to terminal 312 and also extends through and is connected to a plurality of spaced junctions 314, 315, 316, 317, 318, 319, 320 and 321. Main line L-2 extends through and is connected to a plurality of spaced junctions 324, 325, 326, 327 and 328.

A collar form heater ON-OFF switch 332 on the box 306 is connected across junctions 314 and 333, switch 332 being of the type that will remain in either an OFF or an ON position, depending upon which position it is manually set in. Connected across junctions 333 and 324 is a collar form heater 334. Since mechanism 334 is conventional, it will not be described; however, it is to be understood that during the shirt pressing operation, the collar form heater 334 is actuated by closing switch 332.

Connected across junctions 315 and 325 is a photo-electric cell transformer and light emitted member 335, member 335 being mounted on one leg of a generally U-shaped bracket 330 that is bolted to the right side panel 17, see FIGURES 1 and 2. A photo-electric light receiver 348 is mounted on the other leg of bracket 330, the bracket mounting members 335 and 348 in longitudinally spaced relationship and a distance below the table top that the longest length sleeve of a shirt would extend and still be properly folded through the automatic operation of the machine. Further the bracket mounts members 335, 348 transversely outwarldy of panel 17 in a position that the light beam of said members would be broken by a still longer length sleeve draped over the left edge of the machine, see dotted line sleeve of FIGURE 2.

A line 337 connects junction 316 to junction 338, junction 338 in turn being connected via line 339 to the first terminal 340 of the right hand switch 301. A second terminal 342 is connected via line 351 to junction 352, there being provided a switch member 341 for electrically connecting terminals 340 and 342 when the switch 301 is depressed.

A third terminal 343 of the right hand switch is connected via line 353 to junction 338, while a fourth terminal 345 is connected via line 346 to junction 347. A second switch member 344 is provided for electrically connecting terminals 343 and 345 when the switch member 344 is depressed, switch members 344 and 341 being suitably connected together to be simultaneously operated.

The photo-light receiver unit 348 is connected across junctions 347 and 349, said unit electrically connecting junction 347 to junction 349 when it is receiving light from the source 335 but preventing the passage of current when it does not receive light from said source. Also connected across junctions 347 and 349 is a by-pass switch 350, said switch being on the switch box and of the type to remain in either an "ON" or an "OFF" position, depending upon the position at which it is manually set. The by-pass switch is provided to electrically connect terminals 347 and 349 in the event that the unit 335, 348 is inoperative.

Line 356 connects junction 349 to junction 355 which is connected to the first terminal 357 of the solenoid relay 358 via line 359. The second terminal 360 of the relay is connected to junction 352 via line 361, there being provided a switch member 363 for electrically connecting terminals 357 and 360 when the solenoid coil 364 of relay 358 is energized, but breaking electrical connection when the solenoid coil is de-energized. The solenoid coil 364 is connected across junctions 355 and 366. The relay 358 also includes a third terminal 367 which is connected to junctions 326 via line 369 and a fourth terminal 368. A switch member 370 is provided to electrically connect terminals 367 and 368 when the solenoid coil 364 is energized but breaking said connection when the coil is deenergized. The fifth terminal 371 of relay 358 is connected via line 372 to junction 327, while a sixth terminal 373 is connected via line 374 to junction 375. A normally open switch member 376 is provided for electrically connecting terminals 371 and 373 when the coil 364 is energized. The switch members 376, 370 and 363 are suitably connected together to be simultaneously operated upon the energization and de-energization of the coil 364.

Solenoid coil 381 of the second solenoid relay 380 is connected across junctions 366 and 382, junction 382 in turn being connected via line 383 to junction 384. The first terminal 386 is connected via line 385 to junction 384, while the second terminal 392 is connected to junction 318 via line 388. The third terminal 390 of relay 380 is connected via line 391 to terminal 368 of relay 358, while an indicator lamp 400 is connected across junction 319 and a fourth terminal 393 of relay 380. The indicator lamp is mounted by a bracket (not shown) to be located above one of the channels 20 in a position that is observable at all times by the operator, said lamp emitting a steady light while the beam of light of photoelectric unit 333, 348 is broken, and the gear box has been moved to a lower position and right hand switch 301 has been depressed and allowed to return to its datum position as will be described hereinafter, but normally not being lit.

The relay 380 also has a fifth terminal 394, and a sixth terminal 395 that is connected via line 396 to junction 320. The relay 380 is provided with a normally closed switch member 397 that electrically connects terminals 394 and 395; a normally open switch member 398 and a normally open switch member 399. Upon energization of the solenoid coil 381, switch member 399 electrically connects terminals 392 and 386, while switch member 398 electrically connects terminals 390 and 393, and switch member 397 breaks its electrical connection between terminals 394 and 395. Upon de-energization of the coil 381, the switch members 397, 398 and 399 return to the position illustrated in FIGURE 19.

A third solenoid relay 405 has a solenoid coil 406 connected across junctions 407 and 408, said relay including a first terminal 409 that is connected via line 410 to junction 328, a second terminal 411 connected to junction 375 via line 412, a third terminal 414 connected via line 415 to junction 408, and a fourth terminal 416 connected via line 417 to junction 321. There is provided a first switch member 420 and a second switch member 421, switch member 420 electrically connecting terminals 409 and 411 when coil 406 is energized and switch member 421 likewise electrically connecting terminals 414 and 416. The electrical connections made by switch member 420 and 421 are broken upon the de-energization of coil 406.

A limit switch 422 is connected across junctions 321 and 322, the limit switch having a switch member 423 that is constantly resiliently urged to an open position wherein there is no electrical connection between junctions 321 and 322, but upon being depressed electrically connects junction 321 to junction 322, which in turn is connected to junction 408 via line 424. The limit switch is mounted in the control box 226 in position to be moved from its open position to a closed position by the cap nut 225 threaded on the rearward end of hook bolt 69 being moved to the gear box assembly lowered position of FIGURE 3, the switch member 423 having an operator portion extending through an aperture in the control box front wall. Upon the gear box assembly moving toward its datum condition the cap nut 225 is moved away from the switch member 423 and thereby permitting it being resiliently moved to an opened condition.

The solenoid coil 430 of the solenoid operated air control valve 431 is connected across junctions 375 and 432, junction 432 being connected to junction 322 via line 433. The solenoid coil 435 of the second air control valve 436 is likewise connected across junctions 375 and 432, valves 431 and 436 being provided to control the exhaust and application of pressurized air to the pneumatic portion of assembly 175.

The collar formed cylinder air control valve 440 has a solenoid coil 441 connected across terminal 394 and junction 407 which is connected via line 442 to the first terminal 443 of the foot switch 304. The foot switch also includes a second terminal 445 connected via line 446 to junction 328, a third terminal 447 and a switch member 448 resiliently retained in a position to make contact between terminals 445 and 447. However upon the operator exerting a force on the foot pedal member (not shown) the switch member 448 is moved against the action of the spring (not shown) to break the electrical connection between terminals 445 and 447, and these electrically connected terminals 443 and 445; and upon the operator removing her foot, the switch member 448 moves to again electrically connect terminal 445 and 447. The terminal 447 is connected via line 450 to junction 451 which in turn is connected to junction 366 by line 452. Connected across junctions 384 and 451 is solenoid coil 455 of the tilt cylinder air control valve 456.

The left hand switch 302 has a first terminal 487 connected via line 486 to junction 317, a second terminal 489 connected via line 490 to junction 491, and a switch member 488 constantly resiliently urged to an open condition but upon being depressed electrically connecting terminals 487, 489. Junction 491 is connected via line 492 to junction 382 and via line 493 to junction 352.

The air circuitry controls includes the aforementioned valves 431, 436, 440 and 456, controls, connections and components schematically illustrated in FIGURE 19, said components including the pneumatic portion of assembly 175, the collar form cylinder 35, and the tilt cylinder 60. The main air supply line 464 connects a conventional air source 465 to supply air under pressure to the junction 466 on the line 467. In the line 464 there is provided an oiler, a pressure regulator, a pressure gauge, an air cleaner (all which are not shown) and a shut-off valve 464a. In addition to junction 466, the line 467 is also provided with junction 468 and 469.

The aforementioned air control valves and relays 358, 380 and 405 are mounted in the control box 226; although in diagram 19 said valves and relays are represented as being located at different locations and connected by various lines and junctions. The various locations of the valves and the circuit connections thereto are to be considered illustrative and not as a limitation on the invention since such as illustrated in the aforementioned manner in order to facilitate the description of the air circuitry.

Each of the air control valves 431, 436, 440 and 456 include an inlet port, an exhaust port, a connecting member including a control port and solenoid means for moving said connecting member to connect said control port to the inlet port and alternately to the exhaust port. Each of the solenoid means includes a solenoid coil as previously described for the respective valve.

Each of the exhaust ports 431a, 436a, 440a of the valve 431, 436 and 440 respectively is connected by the respective connector lines 470, 471 and 472 to junctions 479, 478 and 477 respectively on the main exhaust line 474 while exhaust port 456a is connected to junction 477 via line 473. The exhaust line 474 is connected to the quick exhaust 475.

The inlet ports 456b and 440b of valves 456 and 440 respectively are connected by appropriate connector lines to junction 468 while the inlet ports 436b and 431b of valves 436 and 431 respectively are likewise connected by appropriate connector lines to junction 469. The control port 431c of valve 431 is connected via line 490 to port 188h of the cap sub-assembly 188 of the pneumatic cylinder portion of assembly 175. The port 186h of sub-assembly 186 of the last mentioned cylinder portion is connected via line 493 to control port 436c, line 493 being provided with a needle valve 494 to control the rate of flow of air through line 493 into said cylinder and primarily the rate of exhaust therefrom.

One end of the collar formed cylinder 35 has a port that is connected via line 498 to the control port 440c, there being provided a needle valve assembly 499 in line 498. The tilt cylinder 60 likewise is connected to control port 456c via line 500 that has a needle valve assembly 501 located therein. When the solenoid coil 455 is in a deenergized condition, the connecting member fluidly connects ports 456c, 456a to exhaust the tilt cylinder, however, upon being energized the exhaust connection is broken and the control port is connected to the inlet port 456b to apply air under pressure to said cylinder. When the solenoid coil 441 of the collar form control valve 440 is deenergized the collar formed cylinder 35 is likewise connected to the exhaust due to the connecting member of the valve fluidly connecting ports 440c and 440a. However upon energization of coil 441 the connecting member breaks the exhaust connection and fluidly connects the port 440c to port 440b to place the cylinder 35 in fluid communication with the air source 465.

When the solenoid coil 430 of the gear box control valve 431 is deenergized the port 188h is placed in fluid communication with the air source 465 through the connecting member fluidly connecting ports 431b to 431c and accordingly forcing the pneumatic cylinder to move to (or remain in) the position illustrated in FIGURES 9 and 19. However upon de-energization of coil 430 the central port 188h is placed in fluid communication with the exhaust through the control member of the valve 430 fluidly connecting control port 431c to port 431a and breaking the fluid connection to port 431b. At the time port 188h is in fluid communication with the air source 465, the solenoid coil 435 of valve 436 is in a de-energized condition and thus port 186h is in fluid communication with the exhaust as the connecting member fluidly connects the control port 436c to the exhaust port 436a. Since the solenoid coils 430 and 435 are connected in parallel, at the time coil 430 is energized, coil 435 is likewise energized. Upon the energization of coil 435 the connecting member of valve 436 breaks the fluid connection between ports 436c and 436a and at this time fluidly connects port 436b to port 436c and accordingly fluidly connects the pressure source 465 to the port 186h of the gear box cylinder.

*Operation.*—For purposes of facilitating the description of the operation of the shirt forming machine it will be assumed that the machine is to be started up after having been turned off at the end of the preceding day.

After turning "on" the main ON-OFF switch 311 the terminals 310 and 312 are electrically connected to energize the transformer and light emitting source 335. At the same time the collar formed heater may be energized upon closing switch 332 to electrically connect junctions 314 and 333. If desired a light under the folding machine table (not shown) that shines through apertures in the table top to aid in positioning the shirt may be turned on closing a similar switch (not shown) on the switch box, the last mentioned switch and the folding machine light advantageously being connected across junctions 314 and 324. Also seal bands are placed in trough 12.

To apply air to the air circuitry of the shirt folding machine, the main control valve 464a in line 464 is turned on and air is thence supplied through line 467 to junctions 468, 469 and through appropriate connection lines to the inlet ports 431b, 436b, 440b and 456b of the respective valves. In this connection it is to be mentioned that upon merely closing the main control switch 311 no movement of the operating structure of the shirt folding machine takes place since the solenoid coils of all of the air control valves 430, 436, 440 and 456 are still in a de-energized condition. However at this time air is applied to the port 188h of the gear box pneumatic piston cylinder combination to retain it relative to the piston in position to hold the cam plate in a datum position.

To be mentioned is that the axes of rotation of shafts 94, 104, 116, 132 extend parallel to one another and lie in a common plane other than for shaft 104 being a fraction of an inch lower; the pivot axis of the size plate also substantially lying in said plane and extending perpendicular to said axes. Also to be noted is that at all times the elongated longitudinal portions of the sleeve folding arms extend parallel to one another and when in a datum position of FIGURE 2 are slightly upwardly and forwardly inclined. Upon the gear box assembly being tilted to a lowered position of FIGURE 3 said longitudinal portions extend generally parallel to the table top but are not moved relative to one another. In either of the aforementioned positions (prior to cam plate 161 being moved in the direction of arrow 207) longitudinally elongated portion of sleeve rods 114, 130 underlie the left and right edge portions respectively of the table top (see FIGURE 1 relative rod 130), and are at the same elevation which is a higher elevation than the elongated portions of rods 142 and 152. Also for each of the aforesaid positions the longitudinal elongated portions of sleeve rods 151 and 142 and prong 144 are spaced a substantial transverse dimension horizontally outwardly of right and left edges of the table top so that the sleeves of the shirt positioned on the table may be readily draped to extend therebetween, the longitudinal portions of rods 130 and 151, and 114 and 142, 144 respectively being substantially as shown in FIGURE 1.

Also to be mentioned is the axes of rotation of the sleeve folding arms 140 and 150 are parallel to the axes of rotation of shafts 94, 104, 116 and 132 but at a substantially lower elevation, see FIGURE 8. Further the size and shape of the mounting arms 115, 131, 143 and 152 together with the radial arms 93 and 103 are such that they may be moved from the datum position of FIGURE 3 to the shirt folding position of FIGURE 11 without interference during the sequence of movement to be described hereinafter. Additionally upon moving the longitudinally elongated proportions of the sleeve folding rods and the folding plates 92 and 102 to the folded condition of FIGURE 11 each of the aforementioned elements will be extended parallel to the table top and closely adjacent thereto in closely stacked relationship, the relative horizontal positions of the aforementioned members being diagrammatically illustrated in FIGURE 18 but the vertical space relationship being exaggerated in order to more clearly illustrate the shirt folding operation.

As an aid to the operator in properly positioning a shirt on the table so that shirt sleeves will be positioned for a proper fold, a U-shaped bracket wire bracket 240 is mounted on either edge portion of the table top to have the web portion located above the surface of the table top, see FIGURES 2 and 15. The brackets 240 help position the sleeves so that the rods 142, 144 and 151 contact the cuffs in the right area during the folding operation. Also as an aid in positioning the shirt on the table and guiding the cuffs as the sleeves are being folded, a sleeve guide 241 is bolted to either side panel to extend horizontally transversely outwardly beyond the respective edge portion of the table top.

In utilizing the machine of this invention the operator grasps the shirt adjacent to the shoulder seams with the back of the shirt towards the operator. Now the foot pedal switch 304 is depressed to contract the collar form blocks 32, 33, the depression of the foot pedal switch breaking the electrical connection through terminals 445 and 447 and electrically connecting terminals 443, 445. Since prior to depressing foot pedal switch the normally closed switch member 397 of the control valve 380 is in a closed position, electrical connecting terminals 443 and 445 energize solenoid coil 441 of the control valve 440 to move its connecting member to fluidly connect the inlet port 440b and control port 440c. This results in air under pressure being applied to the collar formed cylinder to move the piston rod outwardly relative to the cylinder casing (arrow 37 of FIGURE 2) and through conventional linkages (not shown) causing the collar form blocks to retract. Now the shirt is put on the folding machine by positioning the collar on the collar form assembly and thence the foot pedal is released to expand the collar form blocks. Collar form blocks are expanded since upon breaking the electrical connection between the foot pedal terminals 443, 445 solenoid coiol 441 is deenergized and thereupon the valve connecting member fluidly connects control port 440c to 440a to exhaust the collar form cylinder. When the collar form cylinder has been sufficiently exhausted, the coil spring 34 through appropriate linkages causes the collar formed block to move to an expanded position to firmly hold the shirt collar in position.

After the collar form assembly is expanded and the shirt centered over the table (button strip aligned with the longitudinal row of table top apertures—not shown) and the back of the shirt pleated, if neecessary, the operator checks to see that the sleeves are draped over the table top to be located intermediate respective longitudinal rod portions of sleeve folding arms 112 and 140, and 130 and 150 as illustrated in FIGURES 1 and 2. If the shirt sleeve is not of too long a length it will not break the beam of light between photo-cell members 335 and 348 but will at least in part be located directly thereabove.

After the shirt has been properly positioned on the folding table then the right hand switch 301 is depressed so that switch member 344 electrically connects terminals 343, 345; and switch member 341 electrically connects terminals 340, 342. Assuming that the shirt sleeve is not sufficiently long to break the light beam to electric eye member 348, the closing of switch member 344 energizes the solenoid coil 364, foot pedal switch member 348 at this time electrically connecting terminals 447 and 445. This results in switch contact members 363, and 376 of relay 368 moving to a closed position and 370 to an opened position. At the same time that coil 364 is energized, the closing of switch member 341 provides an electric circuit through junctions 352, 491, 382 and the foot pedal switch member 348 to energize solenoid coil 381 of relay 380. This results in the switch member 397 being moved to an open position to prevent the collar form cylinder solenoid valve 441 being energized even if the foot pedal switch is then accidentally depressed, and switch members 398, 399 being moved to a closed position. The movement of switch member 399 of relay 380 to a closed position provides a hold-in circuit to retain the solenoid coil 381 in an energized condition even though the right hand switch is no longer being depressed. At the same time a hold-in circuit is in part provided through junctions 492, 352 and switch member 363 to retain the solenoid coil 364 of relay 358 in an energized condition.

Through the energization of solenoid coils of the relays 380 and 358, the switch member 398 is moved to a closed position. However, at approximately the same time the switch member 370 is moved to an open condition. As a result the lamp indicator 400 at the most only blinks on momentarily because of the changing of positions of the relay switch members.

In the event a shirt is positioned on the table that has a sleeve of sufficient length to break the light beam between elements 348 and 335, then upon depressing the right hand switch the solenoid coil 364 of solenoid 358 will not be energized since the electric eye element 348 provides an open circuit (assuming by-pass switch 350 is open). Accordingly the switch element 370 will remain in a closed condition and upon the energization of solenoid coil 381 through the closing of the right hand switch element 341, the switch element 398 will complete a circuit to energize the indicator light which will stay on until coil 364 is energized or the foot pedal switch depressed. The energization of the indicator light 400 is a visual signal to the operator that the operator will have to manually fold the "long" sleeve shirt in a manner to be described hereinafter.

The depression of the right hand switch element 341 also completes a circuit to energize solenoid coil 455 of the control valve 456 and thereby move its connecting member to fluidly connect control port 456c to inlet port 456b. This results in air under pressure being applied to the tilt cylinder 60 and accordingly the piston rod 61 is moved in a direction of the arrow 66 to rotatably pivot the gear box 41 in the direction of arrow 67 (see FIGURE 3) as has been previously described. When the shirt folding plates have been brought down on top of the shirt to exert their pressural contact against the shirt and the table top, the cap nut 225 on the hook bolt 69 will have depressed the switch member 423 of the limit switch to make an electrical connection between junctions 321 and 322 (see FIGURES 3 and 18).

The closing of the limit switch provides a circuit to energize solenoid coils 430 and 435, the last mentioned circuit including switch member 376 of relay 358 electrically connecting terminals 371 and 373. At the time this happens the piston within the tilt cylinder has engaged an internal stop (not shown) so that no further force is exerted against the gear box to rotate it further in the direction of arrow 67 but air pressure is still applied to said cylinder to retain the gear box in the thus tilted position.

The energization of the coil 430 moves its connecting member to connect the control port 431c of the pneumatic piston cylinder combination of assembly 175 to exhaust port 431a to exhaust the central portion thereof through port 188h, while the energization of solenoid coil 435 causes the connecting member of valve 436 to fluidly connect the control port 436c to control port 436b and thereby apply air under pressure to port 186h of the pneumatic piston cylinder combination. Since the piston 179 and piston rod 176 are stationary while the rest of the pneumatic piston cylinder combination is free to move, the aforementioned energization of solenoid coils 435 and 430 results in the cam plate 161 being translated in the direction of arrow 207 (see FIGURE 9). The initial translatory movement of the cam plate in the direction of arrow 207 imparts angular movement to the roller 124 to thereby cause gear 122 to rotate about its axis in the direction of arrow 230 due to the inclined slotted portion 166a being in abutting engagement with roller 124. The rotational movement of gear 122 causes gears 121 and 147 to be rotated in the direction of the arrows 231 and 232 respectively (see FIGURE 8), the gear 121 being rotated at a substantially faster angular rate than the gear 147 because of a respective sizes. The aforementioned rotation of gear 121 causes shaft 116 to rotate in the same direction and first brings the longitudinal portion of the shirt folding arm 112 into contact with the side of the left hand shirt sleeve 251 (as viewed in FIGURE 1) that is adjacent the left side panel to initiate swinging said sleeve about the left hand edge of a folding table, (see FIGURE 12). At the same time the shirt folding arm 140 is being rotated about the axis of gear 147 but at a slower angular rate. Since the elongated portions 142a and 144a of arm 140 are spaced horizontally outwardly a greater distance from the left side panel than sleeve rod 114, the shirt sleeve 251 does not contact portions 142a and 144a during the initial movement imparted to said sleeve by arm 112. Also to be noted in FIGURE 12 that is a portion of the sleeve 251 radially outwardly of rod 114 is bent at an angle to the remaining portion of the shirt sleeve due to the inertia of the lower end (cuff end) of said sleeve.

Shortly after the time arms 112, 140 have been moved to the position of FIGURE 12, the cam plate is moved in the direction of arrow 207 sufficiently so that the roller 134 is brought into engagement with the slotted portion 162b. Further movement of the cam plate through the slotted portion 162b and the roller 134 imparts rotational movement to the sector gear 137 in the direction of the arrow 233 (see FIGURE 8) which in turn causes gears 136 and 156 to rotate in the direction of arrows 234 and 235 respectively. The rotation of the gears 136 and 156 through the respective shafts on which they are mounted causes shirt folding arms 128 and 150 to be rotated in the same direction about the same axes, shirt folding arm 150 being rotated at a slower angular rate than arm 128 (rod 130). The initial movement of arm 128 swings the longitudinal portion of rod 130 away from the right side panel to bring said rod into contact with the adjacent side of the right sleeve 252 to initiate swinging it about the right hand edge of the table top, the outer end of the right hand sleeve extending at somewhat of an angle relative to the remaining portion of the sleeve due to the inertia of the outer end of the sleeve (see FIGURE 13).

Intermediate the portions of the shirt folding cycle illustrated in FIGURES 12 and 13, the arm 114 has swung to an elevation above the table top and this results in the end of the left hand sleeve body portion adjacent the body portion being folded about the left edge of size plate 92. During this increment of time the cuff portion 251a of the left hand sleeve tends to whip around the rod 114 so that it would be either extended as a straight line continuation of the portion of the sleeve intermediate the folding plate 92 and the rod 114 or angularly in advance thereof. However due to the provision of the rod 142 which is traveling at a slightly slower angular rate and rod 114, the cuff portion 251a engages either elongated portion 142a or elongated portions 142a and 144a to reversely bend it and hold it in a reversely bent condition during the remaining portion of the cycle. By referring to FIGURE 13 it is to be noted that the cuff portion of the left hand sleeve extends intermediate prong 144a and the shirt folding rod portion 142a and accordingly if the prong were not provided there would be no structure to prevent the cuff portion of a sleeve of the length illustrated swinging in advance of the arm 114. That is, the prong 144 has been provided for sleeves of somewhat shorter than average length.

As the cam plate is further translated in the direction of arrow 207 it is moved relative to rollers 124 and 134 so that the roller 124 is just about to leave the slotted portion 166a and the roller 134 is in the mid-portion of slotted portion 162b. Up until this time no rotational movement has been imparted to gear 98 since the roller 101 is located in the horizontally slotted portion 164c. However at this time the cam plate has moved sufficiently so that the roller 101 enters inclined slotted portion 164d to impart rotation to the gear 98 in the direction of the arrow 236. This imparts rotational movement to the left folding plate 92 to rotate it about the axis of gear 98 to cause said folding plate to be elevated relative to the table top. At the time the initial elevation of the left folding plate takes place the sleeve folding rods 114 and 142 are above but adjacent to the right hand side of the size plate (see FIGURE 14). As shown in this figure the cuff 251a of the left hand sleeve 251 is still reversely bent relative to the intermediate portion of a sleeve which extends between shirt folding rod 114 and the left edge of the size plate. Further since the size plate holds intermediate portions of the shirt body in firm pressural contact with the table top, the pivotal movement of the left folding plate causes the left hand side of the body and the portions of the left shirt sleeve intermediate the left edge of the folding plate 92 and the size plate to be folded about an axis that is substantially the same as the left edge of the size plate 50, the axis of rotation of the left fold plate being substantially a straight line continuation of the left edge of the size plate (see FIGURES 1 and 11).

Also at the time that rotational movement is being imparted to the left folding plate 92 the shirt folding arms 128 and 150 have been moved to a position substantially as illustrated in FIGURE 14. As may be seen in FIGURE 14 the portion of the right hand shirt sleeve intermediate the right edge of right folding plate 102 and arm 128 extends upwardly from the table top and thence is somewhat reversely bent intermediate rod 130 and rod 151, rod 151 being in contact with the opposite side of the shirt sleeve from rod 130. Further as may be noted from FIGURE 14 there is a tendency of cuff 252a to whip around rod 130 but this is prevented by rod 151. Additionally the cuff 252a tends to whip around arm 150 (see FIGURE 14), however since at this time the rod 130 has not reached its maximum elevation above the table top a portion of the sleeve extending to the right of rod 130 is pulled around rod 130 to be between rod 130 and the right edge of plate 102 and thereby minimizes, if not does away with, the whipping movement of a cuff 252a.

At about the time rod 114 reaches the FIGURE 14 position, the roller 124 leaves the slotted portion 166a and enters the right half of slotted portion 166b that extends generally horizontally but curved somewhat in an upward direction. During the time said left hand slotted portion 166b engages the roller 124 the arms 112, 140 travel relatively slowly, the coil spring 120 acting to retard the movement of rods 114, 142, and prong 144 to the maximum lower position by compensating for any play, backlash and etc. in the respective gears and cam slot.

At the time the cam plate has moved sufficiently so that the roller 124 enters into the left part of slotted portion 166b the arms 114 and 142 have been moved to make pressural contact through the left shirt sleeve with the size plate, and since the slotted portion 166b extends in a horizontal direction no further rotational movement is imparted to gear 122 and the arms 112, 140 driven thereby. At this time the longitudinal rods 142 and 130 nest in grooves 50b and 50c respectively (shortly after the FIGURE 15 position).

Shortly after the roller 124 enters the slotted portion 166b the rods 130 and 151 have been moved to be nearly directly above rods 114 and 142 and spaced vertically above the size plate. At this time the folding plate 92 is still being elevated since the slotted portion 164d still abuts against roller 101. Also at approximately this same interval of time the cam plate has moved sufficiently in the direction of arrow 207 so that the roller 108 leaves the horizontal slotted portion 164a and enters the inclined slotted portion 164b. This imparts rotation to the gear 107 (direction of arrow 238). This rotation of gear 107 results in the right fold plate 102 being pivotally swung in the direction of arrow 239. Since the shaft 104 rotates about an axis that constitutes approximately a straight line extension of the right hand edge of the size plate the initial pivotal movement of the right fold plate relative to the table top causes the right hand body portion of the shirt to be pivotally folded about said right hand edge. The relative positions of the shirt folding plates and the folding arms at the time the right fold plate is elevated slightly above the table top is illustrated in FIGURE 15.

Still further advancement of the cam plate in the direction of arrow 207 moves it sufficiently so that the elongated portions of arms 128 and 150 press the shirt against the size plate and at that time the roller 134 leaves the inclined portion 162b of the slot 162 and enters the left slightly downwardly curved part of horizontal portion 162c. As a result little pivotal movement of arms 128 and 150 takes place (corresponds to the movement of arms 112, 140 when they enter the slightly upwardly curved part of slotted portion 166b). However roller 101 is still being moved in the slotted portion 164d so that the folding plate 92 is still being swung about its pivotal axis. When the roller 134 enters the right part of slotted portion 162c the longitudinal portions of rods 130, 151 somewhat nest in grooves 50a and 50b respectively. As may be noted in FIGURE 16 the left fold plate is substantially angularly advanced in its folding cycle relative to the folding movement of the right fold plate. Accordingly at the time the fold plate 92 has moved to a position to overlay the sleeve folding arms 128, 150 and 142 the fold plate 102 is still being pivotally swung. Since the fold plate 92 is angularly in advance of the fold plate 102 it will push the cuff 252a to pivot about rod 130 so that said cuff extends parallel to the size plate, provided it is not already extending parallel thereto. This prevents the right cuff being squashed at the time the fold plate 102 would otherwise be in position to contact said cuff, provided said cuff were not reversely bent through the provision of rod 151.

After the fold plate 92 has moved to a position to exert pressural contact with the shirt and the shirt folding arms located intermediate it and the size plate, the cam plate has moved sufficiently so that the roller 108 no longer abuts against the inclined portion 164b but rides in the horizontal portion 164c, and the rollers 134 and 124 likewise riding in horizontal slotted portions. Thus for a short interval of time thereafter only the left fold plate 102 is being pivotally swung. However at the time that plate 102 is brought into engagement to exert pressural contact between the portions of the shirt intermediate it and plate 92, and extends parallel to the table top (the arcuate cutouts of the fold plates forming a space in which the prong 144 is located), the cam plate has moved sufficiently so that the roller 108 enters into slotted portion 164c. At this time cylinder casings have brought the cap sub-assembly 188 into abutting engagement with piston 179 and therefore no further movement takes place. It is to be mentioned that at the time of movement of the cylinder casings cease, the sector gear 137 and roller 134 have been moved relative the slot 162 so that roller 134 is located in the left hand end of slot 162 as viewed in FIGURE 6, the roller 101 in the left hand end of slotted portion 164e, the roller 108 in inclined portion 164c that corresponds to the location of roller 101 is illustrated in FIGURE 5, and roller 124 in the left hand end of the slotted portion 164b to be located closely adjacent the brace 163. Further to be noted is the arcs of swinging movement of the sleeve folding arms are in part illustrated in FIGURES 6 and 12.

In order to control the speed of movement of the cam plate and to cushion the cessation of movement of the pneumatic cylinder casing relative to its piston at the end of the stroke, the hydraulic portion of assembly 175 is provided. At the time that air under pressure is initially applied through port 186h to the pneumatic portion of assembly 175 the relative positions of the cylinder casings to the pistons is nearly as illustrated in FIGURE 9 other than piston 179 abuts against block 186a and piston 203 is a fraction of an inch from block 188a. As initial movement is imparted to the pneumatic cylinder casing 191 and accordingly to the hydraulic cylinder casings 201, 202 there is a tendency for the liquid (oil) in casing 201 to be compressed between the cap sub-assembly 190 and the piston 203 and accordingly to prevent casing 191 moving relative piston 179. The tendency to compress the liquid in casing 201 is in part believed by the flow of liquid in the direction of arrow 207 through the small annular space 204 while there is formed another fluid bypass to relieve the compressive force by liquid within the cylinder casing 201 passing through the fluid channel 190e, thence to the annular space 207 and thence through port 201a and passageway 201b to the opposite side of the piston 203 once casing 201 has moved to place port 201a and passageway 201b respectively to the right of piston 203. Since the valve 205 extends into the fluid channel 190e, 190k (see FIGURE 10), by appropriately adjusting the valve relative its valve seat, the rate of flow of fluid through channel 190e can be controlled. Accordingly this provides a control of the rate of movement of the cylinder casings in the direction of arrow 207 relative to the piston rod 176. In this connection it is also to be noted that the cross sectional area of the fluid channel 190e is substantially smaller than the port 201a and that the port 210 places the oil reservoir 209 in direct fluid communication with the port 201a. Accordingly as the piston casing 201 is moved relative to the piston 203 the space within the confines of the cylinder 201 to the left of piston 203 (as viewed in FIGURE 9) is constantly being filled with oil.

Through the provision of the oil reservoir and port 201a, during the unfolding operation the oil within the confines of cylinder 201 intermediate piston 203 and cap assembly 188 may relatively rapidly exit through port 201a into the annular space 207. Even though the oil exiting through port 201a does not move through the fluid channel 190e sufficiently fast to fill the space within casing 202 intermediate piston 203 and cap sub-assembly 190 this does not hamper the return movement of the casing since the excess oil can flow through port 210 and thence into the reservoir 209. When the aforementioned happens a slight vacuum develops within the casing 201 but shortly after the piston cylinder combinations are returned to a datum position, the oil will drain from reservoir 209 into the annular space 207 between casings 201 and 202 and thence through the fluid channel 190e into the casing 201. The development of the vacuum within the casing 201 also serves to cushion the return of the piston cylinder combinations to a datum position.

The primary cushioning effect toward the end of the unfolding stroke results from casing 201 moving in the direction of arrow 208 so that passageway 201b is directly above piston 203 and subsequently port 201a above said piston. At this time the oil to the left of said piston (only a small quantity) passes through annular space 204. At the end of the return stroke piston 203 is spaced a fraction of an inch from ring 188c, it being noted that there is no O-ring between casing 201 and the adjacent internal shoulder of bore 188f whereby there can be slight leakage around casing 201 back to annular space 207. During the unfolding stroke the main control of the rate of unfolding movement is provided by valve 494 in line 493 to thereby control the rate of exhaust of air from the pneumatic portion of assembly 175.

Due to the provision of the double seal rings 190d when the cylinder is moved in the direction of arrow 207 a certain amount of oil on the piston rod 176 will pass through the left hand ring 190d as viewed in FIGURE 10, however due to the provision of the second ring 190d the rod will be wiped clean. This may ultimately lead to the build up of slight fluid pressure between the rings 190d. However due to the generally U-shaped construction of the seal rings, when the piston cylinder combinations are being moved in the direction of arrow 208 the pressure between the rings will cause the liquid to flow around the right ring 190d back into the annular space intermediate right ring 190d and the retainer ring 190c. Through the provision of the fluid channel 190n this annular space is maintained at a relatively constant pressure, there only being a slight pressure due to the head of oil. Thus the main compressive force of liquid within casing 201 during the folding stroke is isolated from rings 190d through the provision of metal ring 190c and channel 190n. No corresponding channel is provided in assembly 188 since not nearly as large compressive forces are developed during the unfolding due to the relative size of openings through port 201a and channel 201b and the rate control provided by valve 494.

At the time the cam plate has completed its reciprocal movement in the direction of arrow 207 the shirt folding plates and sleeve folding arms have folded the shirt as in part illustrated in FIGURE 11 and as diagrammatically illustrated in FIGURE 18 other than for the aforementioned elements being more closely adjacent one another than illustrated in the last mentioned figure. Now the tail of the shirt is doubled up and folded over the back of a folded shirt, folded about the front edges of the size plate, and if a sealing band is used it would be placed around the shirt in this position. After the tail of the shirt has been folded over then the operator steps on the foot pedal switch to move the switch member 448 to electrically connect terminals 443 and 445, and break the electrical connection between terminals 445 and 447. Since at the time the operator depresses the foot pedal switch, air under pressure is still applied to the closing cylinder 60, the limit switch is still retained in a closed position. Accordingly upon depressing the foot pedal switch the solenoid coil 406 of relay 405 is energized through the limit switch and thereupon moves switch member 421 to electrically connect terminals 414 and 416 to provide a hold-in circuit for solenoid coil 406 as long as the foot pedal switch is retained in the depressed condition. At the same time switch member 420 moves to a closed position to provide an electrical circuit between junctions 375 and 328 that is parallel to the circuit provided by the solenoid relay 358 through the switch member 376. The reason for providing the aforementioned parallel circuit is that upon depressing the foot pedal switch the solenoid coils of relays 358 and 380 together with solenoid coil of air control valve 455 are deenergized but as will become apparent hereinafter it is desired to retain air under pressure to assembly 175 to retain it in its maximum left position by keeping coils 430, 435 energized. Upon the deenergization of solenoid coil 455 the connecting member thereof breaks the fluid communication between the air source and the inlet port of the tilt cylinder and instead connects the tilt cylinder port to the exhaust. After a sufficient quantity of air has exhausted from the tilt cylinder, the spring 68 overcomes the action of the cylinder and through appropriate connections causes the gear box assembly to rotate about pivots 49 in the direction opposite arrows 67 to thereby elevate the folding arms, the fold plates and size plate above the table top to a position corresponding to plate 102 as illustrated in FIGURE 2. Even though the coil spring 78 tends to rotate the tilt plate 74 about its axis to elevate the size plate relative the folding plates as illustrated in FIGURE 2, this is prevented at this time since the fold plates overlie the size plate, and accordingly even though the gear box in pivoting to a datum position moves the roller 85 out of contact with the bracket 86, no movement of the tilt plate relative the gear box takes place. Also due to the deenergization of the solenoid coils of the relays 380 and 358 the hold-in circuits are broken and thus even though the foot pedal is again allowed to be resiliently urged to its datum position, air under pressure is not applied to the closing cylinder and the collar former cylinder until the right hand switch member is again depressed.

Also to be mentioned is that the piston rod 61 of cylinder 60 in moving in a direction opposite arrow 66, the limit switch member 423 is resiliently urged to an open position since cap member 225 is moved away from said switch member. While the operator still steps on the foot pedal switch and holding it depressed even after the shirt folding elements with the shirt folded thereon has been raised above the table in the aforementioned manner; if a plastic bag is to be used, it will then be placed over the shirt before it is removed. In any event with the sleeve folding arms, shirt folding plates and size plate in a folded condition and elevated above the table, the folded shirt is removed. Now the operator releases the foot pedal switch and accordingly the switch member 448 is resiliently urged to break the electrical connection between terminals 443 and 445 and solenoid coil 406 of relay 405 is deenergized. The deenergization of coil 406 breaks the hold-in circuit provided through switch contact member 421 and also breaks the circuit for energizing the solenoid coil 430 and 435 of the control valve 431 and 436 respectively. As a result of the denergization of coil 430 the connecting member of the air control valve 431 is again moved to the position illustrated in FIGURE 19 to fluidly connect the central port 188h of the pneumatic piston cylinder combination to the pressurized source of air 455 and fluidly connects the port 186h to the exhaust through valve 494 due to the connecting member fluidly connecting ports 436a and 436c. Upon the application of air under pressure to port 186h the cylinder casings and cap sub-assemblies are moved in the direction of arrow 208 relative to the piston rod 176 and thereby return to the datum condition illustrated in FIGURE 5. The cam plate in moving from a shirt folded condition to a datum condition causes the shirt fold plates and the sleeve folding arms to move in exact opposite sequence from that described relative to the shirt folding operation. However the time required for them to be moved from a folded condition to the shirt unfolded condition is substantially less as oil exits faster from within cylinder 201 through openings 201a and 201b as previously described than when oil had to exit from the opposite side of piston 203. Upon the shirt folding plate and shirt folding arms returning to the position illustrated in FIGURE 15 (it being understood that there is no shirt on the table at this time), the rod 114 in moving upwardly from the size plate permits the size plate swinging in a direction opposite the arrows 67 through the action of spring 78 causing the tilt plate to pivot relative the gear box in the direction opposite arrow 80. Thus all the mechanism of the shirt folding machine is again returned to a datum condition and is ready for another shirt folding operation such as described heretofore.

It may be mentioned that the gear box or drive cylinder is operated by air in both the fold and unfold cycles. During the fold cycle the speed of operation of the drive cylinder is controlled by the hydraulic cylinder which meters the flow of oil through passageway 190e as described and thereby allowing some range in adjusting the folding speed. If set correctly the shirt should fold in 1½ to 2 seconds time. If faster than this the fold is possibly damaged while if slower the shirt may be folded tooo loosely. The unfolding speed of the arms is controlled by the flow of the control valve 494 mounted below the control valve on the right hand side. The arms should open smoothly. In case of a mislay of a shirt, the folding operation can be cancelled at any time merely by depressing the foot switch and then releasing it.

For shirts with French cuffs the folding operation is the same as that described heretofore up to the point of depressing the right hand switch. Thus in folding shirts with French cuffs the shirt is positioned on the collar form by first depressing the foot pedal switch to retract the collar formed blocks, thence releasing it to expand the collar forms, and then the shirt is properly positioned on the table prior to the folding operation. After the shirt has thus been properly positioned, instead of depressing the right hand switch, only the left hand switch is depressed. Upon depressing the left hand switch 302 the switch member 488 electrically connects terminals 487 and 489 to thereby energize the solenoid coil 381 of relay 380 through members 445, 447 and 448 of the foot pedal switch. The thus energizing coil 381 provides a hold-in circuit through switch member 399 as described heretofore to retain the coil 381 in an energized condition even though the operator releases the pressure from left hand switch member 488. The energization of the coil 381 also opens the switch member 397 to preclude inadvertaent closing of the operation of the collar formed cylinder. Initially the switch member 488 in an "on" condition and thence the hold-in circuit for coil 381 energizes the solenoid coil 455 of valve 456 to move its connecting member so that air under pressuer is applied through ports 456b and 456c to the tilt cylinder to pivotally move the gear box assembly including folding arms, fold plates and the size plate to a lowered condition as has been described heretofore Now the sleeves are hand folded and cuffs properly positioned and thence the right hand switch is depressed to actuate the cam plate to move in the direction of arrow 207 whereupon the shirt sleeve folding arms will be swung through the folding movements described heretofore even though the shirt sleeves are not being swung by said arms as described heretofore. However the movement of the folding plates will cause the shoulder portions to be folded. After this has taken place the foot pedal is again depressed to cause elevating tilting movement of the gear box and the operation proceeds as has been described above. During the period of time between pressing the left hand switch 302 and the right hand switch the indicator lamp was on through a circuit previously described.

In the event that sport shirts which have short sleeves are to be folded the shirt folding operation is the same as described with reference to French cuffs other than after the left hand switch has been depressed to lower the fold plates and size plate, the short sleeves are folded and clipped under clips 92a and 102a on the folding plates prior to depressing the right hand switch.

Another feature of the invention not brought out here tofore is that through the timing of the swinging movement of the sleeve folding arm and the size plate the cuffs are properly folded relative to the shoulder portion of the shirt body and sleeves so that they will not be squashed in the manner described in the forward part of the specification. As may be seen when referring to FIGURES 13–16 inclusive, prior to the time that the sleeve folding rods 142, 144 have moved to the FIGURE 13 position, rod 142 has caused the cuff portion of the left hand sleeve to be reversely bent relative to the remaining portion of the sleeve. Thus as the continued movement of the rods 114, 142 from the FIGURE 13 position to a position closely adjacent the size plate as shown in FIGURE 15, the cuff of the left hand sleeve is bent so that it extends in the same direction as the continuous length of the right sleeve intermediate arm 130 and the right folding plate. Accordingly the aforementioned remaining portion of the right sleeve upon bearing against the left cuff will cause it to be more firmly folded against the main body portion of the left sleeve. This is in contrast to the occasional operation of prior art machines of the nature of the Plehal patent that had four folding elements plus a size plate where the left hand cuff instead of extending as illustrated in FIGURE 15 will extend in an opposite direction toward the right hand edge of the size plate and slightly upwardly. In the event that the left cuff were extended in the outward direction it would be inclined in the direction opposite the movement of the main body portion of the left sleeve and accordingly would result in the left cuff to be crushed (wrinkled). With reference to the right cuff, it is to be noted from FIGURES 14 and 15 that the shirt folding rods 130, 151 positively preclude the cuff 252a from extending in the same direction as the main body portion of the right sleeve but rather causes it to be reversely bent so that it overlays the main body portion of the right sleeve. Accordingly as the left fold plate 92 moves from the FIGURE 16 position to the FIGURE 17 position the open portion of the cuff extends outwardly in the direction opposite or away from fold plate 92. Thus as the left fold plate moves from the FIGURE 16 to the FIGURE 17 position its folding action operates against the cuff 252a to fold about arm 130 and thereby flat against the adjacent portion of the right sleeve, the rod 151 retaining the cuff in this position prior to the plate 92 being moved to a shirt folded condition. Then the left plate swings over arm 150 and traps or keeps the right cuff folded back on the right sleeve. As apparent from the above with the machine of this invention, the rod 151 and 142a, 144a hold the respective cuffs in a reversely bent condition so that the fold plates in folding the shoulder portions of the shirt do not result in the cuffs being crushed or wrinkled.

As many widely apparently different embodiments of this invention may be made without departing from the spirit and scope thereof, it is to be understood that we do not limit ourselves to the specific embodiments herein.

What we claim is:

1. A shirt folding machine comprising a frame, a table having opposite edges mounted on said frame, transverse support means mounted on said frame for rocking movement at one end of said table between a datum position and a lowered position, a size plate mounted on said support means in overhanging relation to said table, a pair of shirt fold members swingably mounted on said support means, said shirt fold members mounted to extend over the table with one on either side of said size plate in a datum condition, a pair of sleeve folding arms also swingably mounted on said support means, said sleeve arms having longitudinally elongated portions and mounted on the support means to normally have said longitudinal positions at an elevation below said table and underlying opposite adjacent table edge portions when said support means is in its datum position, third and a fourth sleeve folding arms each having longitudinally extending portions and being swingably mounted on said support means to have their respective longitudinal portions located transversely horizontally outwardly of the adjacent table opposite edge and generally at a lower elevation than paid pair of sleeve arms longitudinal portions, first operating means for rocking said support means to lower the size plate to a position adjacent the table top second operating means for sequentially moving said sleeve folding arms and shirt fold members through folding paths to fold a shirt about the size plate after the support means has been moved to a lowered position, a power source, control means connected to said lower source for activating said first and second operating means, said control means, including a first operator control having an on position for conducting power from the power source and an off non-power conducting position, first means connected in series with said first operator control for activating said first operating means to rock said support means to its lowered position upon operating said first operator control to an on position, a second operator control having an on position for conducting power from the power source and an off non-power conducting position, sensing means connected in series with said second operator control for sensing a sleeve of a shirt positioned on said table in condition to be pressed that extends below more than a predetermined distance below the table top and conducting power passing through said second operator control only as long as the sleeve of the thus positioned shirt is located above said predetermined distance and means connected in series with the second operator control and the sensing means to activate the second operating means when no shirt sleeve is being sensed by said sensing means, the support means is in a lowered condition and the second control is in on position.

2. A shirt folding machine comprising a frame, a table having opposite edges mounted on said frame, transverse support means mounted on said frame for rocking movement at one end of said table between a datum position and a lowered position, a size plate mounted on said support means in overhanging relation to said table, a pair of shirt fold members swingably mounted on said support means, said shirt fold members mounted to extend over the table with one on either side of said size plate in a datum condition, a pair of sleeve folding arms also swingably mounted on said support means, said sleeve folding arms having longitudinally elongated portions and mounted on the support means to normally have said longitudinal positions at an elevation below said table and underlying opposite adjacent table edge portions when said support means is in its datum position, third and a fourth sleeve folding arms each having longitudinally extending portions and being swingably mounted on said support means to have their respective longitudinal portions located transversely horizontally outwardly of the adjacent table opposite edge and generally at a lower elevation than said pair of sleeve arms longitudinal portions, operating means for rocking said support means to lower the size plate to a position adjacent the table top and then sequentially moving said sleeve folding arms and shirt fold members through folding paths to fold a shirt about the size plate, said operating means including a piston rod mounted by the support means stationary relative thereto, a piston stationarily mounted on said piston rod, two-way acting cylinder means slidably mounted on said piston rod with the piston mounted therein, a cam plate having a plurality of cam slots therein mounted on said cylinder means for movement therewith, and means on the support means and connected to the sleeve folding arms and fold members including cam followers extending into the respective cam slots for moving said arms and members in proper sesequence to fold a shirt about said size plate, and control means for actuating the operating means.

3. The structure of claim 2 further characterized in that said operating means includes first means for moving the support means between a size plate lowered position and a datum position and that said control means includes second means to actuate said cylinder means in one direction to move said cam plate to cause said folding elements to be moved through folding paths after said support means has been moved to its lowered position, and third means cooperating with the second means for retaining said cylinder means at the end of its path of movement in one direction and operating said first means to return the support means to its datum position.

4. In a shirt folding machine having a frame, a table mounted on said frame, support means mounted on said frame for rocking movement at one end of said table, a size plate mounted on said support means in a position to overhang said table, a plurality of swingable folding elements mounted on said support means to extend over said table, means for rocking said support means in a direction to lower said size plate and said folding elements onto said table, the improvement comprising a transversely extending piston rod stationarily mounted on said support means, a piston stationarily mounted on said piston rod, a two way acting cylinder movably mounted on said piston rod with the piston therein, a cam member mounted on said cylinder for movement therewith, means driven by said cam member and connected to said folding elements for actuating said folding elements in succession through folding paths as the cylinder moves in one direction and alternately actuating said folding elements in succession through unfolding paths as said cylinder moves in an opposite direction, and control means for said rocking means to operate said rocking means to lower said size plate and then actuating said cylinder in said one direction, said control means including means for selectively actuating said cylinder in said opposite direction once the cylinder has moved in said one direction.

5. A shirt folding machine comprising a frame, a table mounted on said frame; transversely extending support means mounted on said frame for rocking movement at one end of said table; a size plate mounted on said support means in a position so as to overhang said table; a plurality of swingable folding elements mounted on said support means so as to extend over said table; sleeve folding members swingably mounted on said support means for movement from unfolded positions below the level of the table to folded positions above the size plate in a lowered condition; means for rocking said support means in a direction to lower said size plate and said folding elements onto said table, and lower said sleeve folding members; means mounted on the support means and connected to said folding elements and folding members for operating folding members and folding elements from an unfolded position in succession through folding paths, control and operating means for said rocking means to operate said rocking means to lower said size plate, folding element and folding means and then actuating said folding members and folding elements operating means to fold a shirt, said control means including first means for selectively operating said rocking means to lower said size plate, folding elements and folding members, second means operated to actuate said folding members and folding elements in succession through folding paths, third means serially connected to said second means for sensing a shirt sleeve extending more than a predetermined distance below the table top of a shirt on the table in condition to be folded to preclude operation of said second means and permitting operation of said third means as long as no shirt sleeve is sensed and means serially connected to said first means for selectively actuating said first means and also serially connected with said second and third means to selectively actuate said second means other than when said third means senses a shirt sleeve that extends below the table top more than said predetermined distance.

6. The structure of claim 5 further characterized in that control means includes a pair of electrical power lines, that the means serially connected to said first means includes a manually operated on-off switch resiliently urged to an off condition connected to one of said lines, and that said third means is a photo-electric cell assembly having a light emitting unit connetced across said lines and a light receiving unit mounted in position to receive light from said light emitting unit and connected in series between said switch and second means to permit passage of electricity as long as it receives light from said light emitting unit and providing an open circuit when no light is received from said light emitting unit, said first means and third means including an electrical connection to said other line.

7. The structure of clam 6 further characterized in that said electrical connection is provided by a two position foot pedal switch that is resiliently retained in one position to permit conduction current through said first, second and third means and a second position to block the flow of current therethrough.

8. The structure of claim 6 further characterized in that said folding members include a first sleeve folding arm and a second sleeve folding arm mounted on one transverse end portion of said support means to pivot about transversely spaced longitudinal extending axes, the first arm in an unfolded condition having a generally longitudinally extending portion underlying the adjacent transverse portion of the table and the second arm in an unfolded condition having a generally longitudinally extending portion generally at a lower elevation than the first arm portion and located horizontally transversely outwardly beyond the adjacent transverse portion of the table whereby a sleeve of the shirt positioned on the table in condition to be folded will depend downwardly between said arm portions, and that there is provided means supported by the frame for mounting said light receiving unit and light emitting unit in spaced apart relation to have said sleeve extend therebetween, provided it extends beyond a predetermined distance below the table top.

9. In a shirt folding machine having a frame, a table mounted on said frame, a size plate and a plurality of swingable folding elements mounted to at least in a shirt folded condition extend over said table, transversely extending support means movably mounted on one end of said table for mounting said size plate and said elements for movement from a datum shirt unfolded condition to said shirt folded condition, at least one of said elements in a shirt unfolded condition having a longitudinally extending portion positioned in underlying relationship to one transverse edge portion of the table and at an elevation for movement to abut against a sleeve of a shirt positioned in the table in condition to be folded, means on the frame for moving said support means, size plate and folding elements between the shirt unfolded condition and the shirt folded condition, means for operating the last mentioned means, the improvement comprising a photoelectric light emitting unit, a photoelectric light receiving unit that provides an electric circuit to conduct current when receiving light from said emitting unit and block the passage of current when it does not receive light for said emitting agent, means for mounting said units on the frame in spaced apart relationship to have said sleeve break the beam of light from the light emitting unit to the light receiving unit provided the sleeve extends more than a predetermined distance below the table top and electric control means to actuate said operating means to move said size plate to a shirt folded position and to operate said folding element having said longitudinal portion to a folded condition only when the sleeve of the shirt positioned in the table in condition to be pressed at its lower end is at an elevation above said beam of light.

10. The structure of claim 9 further characterized in that there is provided on-off switch means connected to said control means for selectively by-passing said light receiving unit.

11. A shirt folding machine comprising a table, support means mounted for rocking movement at one end of said table, a size plate carried by said support means and overhanging said table, a plurality of swingable folding elements mounted on said support means, means for rocking said support means in a direction to lower said size plate and said folding elements including a first air cylinder, means for operating said folding elements in succession including a cylinder assembly mounted in said support means and having a movable subassembly, means for effecting the operation of said first air cylinder so as to rock said supporting means into its lowered position and thence automatically effecting operation of said subassembly so as to actuate said folding elements through their folding path by way of movement of said subassembly, the last mentioned means including a foot pedal switch having at least a datum position and a second position and means operated by the foot pedal switch being moved to said second position after the folding elements have moved through their folding path to cause the first air cylinder to return to its initial condition while retaining the size plate and folding elements in a folded condition and thence upon said foot pedal switch being returned to its datum condition to cause said folding elements operating means to return said folding elements to a datum condition.

12. A shirt folding machine comprising a table, support means mounted for rocking movement at one end of said table, a size plate carried by said support means and overhanging said table, a plurality of swingable folding elements mounted on said support means, means for rocking said support means in a direction to lower said size plate and said folding elements including a first air cylinder, means for operating said folding elements in succession including a piston cylinder assembly having a transverse piston rod mounted on said support means, a piston stationarily mounted on said piston rod, a two way acting pneumatic operated cylinder portion movably mounted on said piston rod with said first piston therein, a second piston stationarily mounted on said piston rod, and hydraulic cylinder means connected to said pneumatic cylinder portion and containing said second piston for controlling the rate of movement of said pneumatic cylinder portion relative said piston rod, cam means operated by movement of said pneumatic cylinder portion for operating said folding elements in succession, means for selectively effecting the operation of said first air cylinder so as to rock said supporting means to its lowered position, thence effecting operation of said piston cylinder assembly so as to actuate said folding elements through their folding paths and subsequently selectively return said first air cylinder to its initial position and after the folded shirt has been removed, the size plate and folding elements to their initial position.

13. The structure of claim 12 further characterized in that said hydraulic cylinder means includes a first cylinder casing of a diameter to provide a small annular clearance with said second piston, a second cylinder casing of substantially larger diameter mounted to provide an enclosed space between it and said first casing, metering means slidably mounted on the piston rod in sealing engagement therewith for mounting the one ends of said casings in the aforementioned manner and providing a fluid passageway between said casings to adjustably control the flow of fluid from between the one interior end portion of said first casing and said enclosed space, and means slidably mounted on the piston rod in sealing engagement therewith and at the opposite ends of said casings for mounting said casings, said first casing having an opening adjacent the last mentioned means of a larger area than said fluid passageway that places the interior of said first casing in fluid communication with said enclosed space.

14. A shirt folding machine comprising a frame, a table mounted in said frame and having a table top and opposite edges, transversely extending support means mounted on the frame at one end of said table for rocking movement between a datum position and a lowered position, a size plate mounted on said support means in overhanging relation to said table top, first and second side fold members swingably mounted on the support members to rotate about generally longitudinal axes respectively located at opposite sides of the size plate when in a support means lowered position and to overhang the table top, first, second, third and fourth sleeve folding arms swingably mounted on said support means to rotate about generally longitudinal axes between a support means lowered position and a shirt folded position, the axes of the first and second arms being respectively located transversely outwardly from the folding members axes and on opposite transverse sides thereof, the first and second arms in a support means lowered position in an unfolded position each having a longitudinal portion extending generally parallel to the table top and underlying opposite edge portions of the table while the third and fourth arms in the same position each have a longitudinal portion extending generally parallel to the table top located horizontally transversely outwardly of the opposite edge portions of the table and vertically at lower elevations than the first and second arms longitudinal portions, first means for operating the support means between its positions, second means for swinging said folding members and folding arms in proper sequence through the respective folding path to fold a shirt about the size plate, and control means for first actuating said first means to move the support means to its lowered position and then actuating said second means to move said folding arms and folding members to their shirt folded positions.

15. The structure of claim 14 further characterized in that the second arm includes a prong mounted on the secoind arm longitudinal portion that has a longitudinal portion extending generally parallel to the second arm longitudinal portion and located at a substantially higher elevation than said second arm longitudinal portion and more closely horizontally adjacent the table top.

16. The structure of claim 14 further characterized in that said machine is provided for folding a shirt having a first and second sleeve with their respective cuffs after the shirt is positioned on the machine with one sleeve depending between the first and third arms longitudinal portions and the other sleeve depending between the second and fourth arms longitudinal portions, that said second means includes means for swinging the first and third arms simultaneously but the third arm at a slower angular rate to hold the adjacent cuff for swinging angularly in advance of the first arm and move said cuff to a reversely bent condition relative its sleeve as said sleeve is being folded, means for swinging the second and fourth arms simultaneously but the fourth arm at a lower angular rate to hold the other cuff from swinging angularly in advance of the second arm and move said other cuff to a reversely bent condition relative its sleeve as said sleeve is being folded, and drive means for first initiating the movement first and second arm swinging means, then the second and fourth arm swinging means, and thence the first and second folding members in proper sequence and to continue the movement of said swinging means and folding members in proper sequence to fold the shirt.

17. The structure of claim 16 further characterized in that said drive means includes reciprocal movable cam plate for driving said swinging means in the aforementioned manner, means driven by said cam plate for swinging said folding members in the aforementioned manner, and a piston cylinder assembly mounted on said support means for reciprocating the cam plate.

18. In a shirt folding machine, a frame, a table mounted on said frame, transversely extending support means mounted on said frame at one end of said table for tiltable movement between a datum position and a lowered position, shirt folding members mounted on said support means to in said datum position overhang said table and in said lowered position make pressural contact with the body of a shirt positioned on said table, first and third sleeve folding arms mounted on one transverse end portion of said support means to swing about separate transversely spaced, generally longitudinal axes from a first sleeve unfolded position to a first sleeve folded position, second and fourth sleeve folding arms mounted on the opposite transverse end portion of said support means to swing about transversely spaced, generally longitudinal axes from a second shirt sleeve unfolded position to a second sleeve folded position, the said axes of second and fourth arms being more transversely remotely located relative to one another than said axes of the first and third arms, each of said arms having generally longitudinally extending portions that in a support means lowered position extend generally parallel to the table with the longitudinal portions of the first and second arms underlying oposite transverse edge portions of the table in a sleeve unfolded position and the second and fourth arms being located horizontally outwardly of the said transverse edge portions in a sleeve unfolded position and at higher elevations, and means for operating the support means between its position and the arms in proper sequence to fold the shirt sleeves while moving the first and second arms relative to one another to reversely bend the cuff of the first sleeve relative to the remaining portion of said first sleeve as it is folded and the third and fourth arms relative to one another to reversely bend the cuff of the second sleeve relative the remaining portions of second sleeve as it is folded.

19. The structure of claim 18 further characterized in the axes of the second and fourth arms are located at about the same elevation and at generally a substantially lower elevation than the axes of the first and third arms and that said operating means includes a first, second, third and fourth gear keyed on the first, second, third and fourth arms respectively, the first and third gears being substantially the same size and the second and fourth gears being substantially the same size which is substantially larger than the first and third gears, a fifth gear mounted on support means in intermeshing relationship with said first and second gears, a sixth gear of substantially the same size as the fifth gear mounted on the support means in intermeshing relationship with said third and fourth gears and means for initially drivingly rotating only the fifth gear in one direction and thence drivingly rotating both the fifth and sixth gears in the same direction to swing said arms through said sleeve folding paths.

References Cited by the Examiner
UNITED STATES PATENTS

| | | | |
|---|---|---|---|
| 2,362,976 | 11/44 | Cooper | 223—37 |
| 2,839,231 | 6/58 | Strike | 223—73 |
| 2,950,848 | 8/60 | Gayring | 223—37 |
| 3,051,359 | 8/62 | Gayring | 223—73 |

JORDAN FRANKLIN, *Primary Examiner.*